(12) United States Patent
Yamamoto et al.

(10) Patent No.: US 10,676,076 B2
(45) Date of Patent: Jun. 9, 2020

(54) CONTROL DEVICE OF VEHICLE

(71) Applicant: TOYOTA JIDOSHA KABUSHIKI KAISHA, Toyota-shi, Aichi-ken (JP)

(72) Inventors: Masafumi Yamamoto, Nagakute (JP); Atsushi Tabata, Okazaki (JP); Tatsuya Imamura, Okazaki (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 16/013,402

(22) Filed: Jun. 20, 2018

(65) Prior Publication Data

US 2019/0084553 A1    Mar. 21, 2019

(30) Foreign Application Priority Data

Sep. 21, 2017   (JP) ................................ 2017-181653

(51) Int. Cl.
| | |
|---|---|
| *B60W 10/08* | (2006.01) |
| *B60K 6/445* | (2007.10) |
| *B60W 20/10* | (2016.01) |
| *B60W 10/06* | (2006.01) |
| *B60W 20/20* | (2016.01) |

(Continued)

(52) U.S. Cl.
CPC ............ *B60W 10/08* (2013.01); *B60K 6/365* (2013.01); *B60K 6/387* (2013.01); *B60K 6/445* (2013.01); *B60W 10/06* (2013.01); *B60W 20/10* (2013.01); *B60W 20/20* (2013.01); *B60W 30/192* (2013.01); *B60K 2006/381* (2013.01); *B60W 2510/0638* (2013.01); *B60W 2510/0685* (2013.01); *B60W 2510/081* (2013.01);

(Continued)

(58) Field of Classification Search
None
See application file for complete search history.

(56) References Cited

U.S. PATENT DOCUMENTS 7,252,611 B2 * 8/2007 Raghavan .............. B60K 6/365
                                                               475/5
7,273,435 B2 * 9/2007 Raghavan .............. B60K 6/365
                                                             475/151

(Continued)

FOREIGN PATENT DOCUMENTS

| JP | 2009-143377 A | 7/2009 |
|---|---|---|
| JP | 2017-178299 A | 10/2017 |
| WO | 2013/114594 A1 | 8/2013 |

*Primary Examiner* — Dirk Wright
(74) *Attorney, Agent, or Firm* — Oliff PLC

(57) ABSTRACT

A control device includes an electronic control unit configured to selectively execute traveling in a first traveling mode and traveling in a second traveling mode, the first traveling mode being a traveling mode in which in a state where one engagement device is controlled so as to be engaged, a differential state is controlled by a first rotating machine to transmit torque of an engine, and the second traveling mode being a traveling mode in which in a state where the other engagement device is controlled so as to be engaged, a differential state is controlled to transmit torque of the engine, and perform switching to traveling in the second traveling mode in a case where a vehicle speed is equal to or higher than a predetermined vehicle speed when engine stop control that stops the engine is executed during traveling in the first traveling mode.

5 Claims, 27 Drawing Sheets

(51) Int. Cl.
*B60K 6/365* (2007.10)
*B60K 6/387* (2007.10)
*B60W 30/192* (2012.01)
*B60K 6/38* (2007.10)

(52) U.S. Cl.
CPC . *B60W 2520/10* (2013.01); *B60W 2710/0666* (2013.01); *B60W 2710/083* (2013.01)

(56) References Cited

U.S. PATENT DOCUMENTS

| | | | | |
|---|---|---|---|---|
| 7,967,711 | B2 * | 6/2011 | Conlon | B60K 6/40 |
| | | | | 475/5 |
| 7,998,016 | B2 * | 8/2011 | Si | B60K 6/365 |
| | | | | 475/284 |
| 8,246,499 | B2 * | 8/2012 | Iwanaka | B60L 58/12 |
| | | | | 475/5 |
| 8,287,412 | B2 * | 10/2012 | Lee | B60W 20/15 |
| | | | | 475/5 |
| 8,313,401 | B2 * | 11/2012 | Kim | B60K 6/365 |
| | | | | 475/5 |
| 9,193,349 | B2 * | 11/2015 | Kiyokami | B60K 6/445 |
| 9,216,641 | B2 * | 12/2015 | Ono | B60K 6/365 |
| 9,409,568 | B2 * | 8/2016 | Yamamoto | B60K 6/387 |
| 9,421,858 | B2 * | 8/2016 | Hayashi | B60K 6/365 |
| 9,452,751 | B2 * | 9/2016 | Matsubara | B60W 10/02 |
| 9,475,478 | B2 * | 10/2016 | Kodama | B60W 20/15 |
| 9,562,481 | B2 * | 2/2017 | Matsubara | B60K 6/445 |
| 9,718,459 | B2 * | 8/2017 | Imamura | B60W 20/14 |
| 10,093,165 | B2 * | 10/2018 | Imamura | B60W 20/14 |
| 10,350,983 | B2 * | 7/2019 | Imamura | B60W 10/06 |
| 2015/0021110 | A1 | 1/2015 | Ono et al. | |

* cited by examiner

FIG. 3

| TRAVELING MODE | | | | | | CL1 | BR1 | CLc | MG1 | MG2 |
|---|---|---|---|---|---|---|---|---|---|---|
| MOTOR TRAVELING (EV TRAVELING) | FORWARD MOVEMENT/ BACKWARD MOVEMENT | SINGLE DRIVE | DRIVE | NORMAL | | | | | | M |
| | | | | STANDBY MODE | O/D INPUT SPLIT | | | ○ | | M |
| | | | | | U/D INPUT SPLIT | ○ | | | | M |
| | | | ENGINE BRAKE COMBINED | O/D INPUT SPLIT | | | | △ | G | M |
| | | | | U/D INPUT SPLIT | | △ | | | G | M |
| | | DUAL DRIVE | | | | ○ | ○ | | M | M |
| ENGINE TRAVELING (HV TRAVELING) | O/D INPUT SPLIT | FORWARD MOVEMENT | | | | | | ○ | G | M |
| | | BACKWARD MOVEMENT | ENGINE FORWARD ROTATION INPUT | | | | | ○ | G | M |
| | U/D INPUT SPLIT | FORWARD MOVEMENT | | | | ○ | | | G | M |
| | | BACKWARD MOVEMENT | ENGINE REVERSE ROTATION INPUT | | | | ○ | | G | M |
| | | | ENGINE FORWARD ROTATION INPUT | | | ○ | | | G | M |
| | FIXED STATE | FORWARD MOVEMENT | DIRECT CONNECTION | | | ○ | | ○ | | |
| | | | OUTPUT SHAFT FIXING | | | | ○ | ○ | G | |

○: ENGAGEMENT
△: ENGAGEMENT OF ANY ONE OR ENGAGEMENT OF BOTH SIDES IN ENGINE BRAKE COMBINED MODE
G: MAINLY GENERATOR
M: MAINLY MOTOR, HOWEVER, GENERATOR IN REGENERATION
BLANK: DISENGAGEMENT

CONTROL DEVICE OF VEHICLE

INCORPORATION BY REFERENCE

The disclosure of Japanese Patent Application No. 2017-181653 filed on Sep. 21, 2017 including the specification, drawings and abstract is incorporated herein by reference in its entirety.

BACKGROUND

1. Technical Field

The present disclosure relates to a control device of a vehicle provided with a first differential mechanism connected such that an engine transmits power thereto, a second differential mechanism in which a differential state is controlled by controlling an operating state of a first rotating machine, and a second rotating machine connected so as to transmit power to an output rotating member connected to drive wheels.

2. Description of Related Art

A vehicle is well known that is provided with a first differential mechanism having a first rotation element, a second rotation element, and a third rotation element and connected such that an engine transmits power thereto, a second differential mechanism that has a fourth rotation element, a fifth rotation element, and a sixth rotation element, and in which a differential state is controlled by controlling an operating state of a first rotating machine, and a second rotating machine connected so as to transmit power to an output rotating member connected to drive wheels. As the vehicle described above, there is a vehicle disclosed in, for example, WO 2013/114594. WO 2013/114594 discloses a vehicle that is provided with a differential part (corresponding to a second differential mechanism) in which a differential state is controlled, and a speed change part (corresponding to a first differential mechanism) provided in a power transmission path between an engine and the differential part and capable of being switched between two stages; a low stage and a high stage.

SUMMARY

It is conceivable that a differential mechanism having a power split ratio different from the power split ratio in the second differential mechanism alone is configured by adding an engagement device that changes the connection state between the first differential mechanism and the second differential mechanism. In the above configuration, when executing engine stop control that stops the engine during traveling in an engine traveling mode with the drive of the engine, depending on a control aspect of the engine stop control, there is a case where the first rotating machine enters an overspeed state during the engine stop control, and thus there is room for improvement.

The present disclosure provides a control device that can suppress overspeed of a first rotating machine during execution of engine stop control in a vehicle provided with a first differential mechanism connected such that an engine transmits power thereto, a second differential mechanism in which a differential state is controlled by controlling an operating state of the first rotating machine, and a second rotating machine connected so as to transmit power to an output rotating member connected to drive wheels.

An aspect of the present disclosure relates to a control device of a vehicle. The vehicle includes a first rotating machine, a second rotating machine, an engine, a first differential mechanism, a second differential mechanism, an output rotating member that is connected to drive wheels of the vehicle, a first engagement device, and a second engagement device. The first differential mechanism includes a first rotation element, a second rotation element, and a third rotation element. The second differential mechanism includes a fourth rotation element, a fifth rotation element, and a sixth rotation element. The second rotating machine is connected so as to transmit power to the output rotating member. The engine is connected so as to transmit power to the first rotation element. The third rotation element is connected to the sixth rotation element. The first rotating machine is connected so as to transmit power to the fourth rotation element so as to control a differential state of the second differential mechanism. The fifth rotation element is connected to the output rotating member. The first engagement device is configured to selectively connect any two rotation elements among the first rotation element, the second rotation element, and the third rotation element. The second engagement device is configured to selectively connect any one rotation element of the fourth rotation element and the fifth rotation element, and the second rotation element. The control device includes an electronic control unit configured to selectively execute traveling in a first traveling mode and traveling in a second traveling mode, the first traveling mode being a traveling mode in which in a state where one engagement device of the first engagement device and the second engagement device is controlled so as to be engaged, a differential state of the second differential mechanism is controlled by the first rotating machine to transmit torque of the engine to the fifth rotation element, and the second traveling mode being a traveling mode in which in a state where the other engagement device of the first engagement device and the second engagement device is controlled so as to be engaged, a differential state of the second differential mechanism is controlled by the first rotating machine to transmit torque of the engine to the fifth rotation element, and perform switching to traveling in the second traveling mode in a case where a vehicle speed is equal to or higher than a predetermined vehicle speed when engine stop control that stops the engine is executed during traveling in the first traveling mode.

In the control device according to the aspect of the present disclosure, the electronic control unit may be configured to execute traveling in a third traveling mode, the third traveling mode being a traveling mode in which in a state where the first engagement device and the second engagement device are controlled so as to be engaged, each rotation element of the first differential mechanism and each rotation element of the second differential mechanism integrally rotate to directly transmit torque of the engine to the fifth rotation element, and the electronic control unit may be configured to perform switching from the first traveling mode to the second traveling mode via the third traveling mode in a case where a determination that a rotation speed of the engine does not increase even in switching from the first traveling mode to the third traveling mode is made.

In the control device according to the aspect of the present disclosure, the electronic control unit may be configured to execute traveling in a fourth traveling mode when the engine stops, the fourth traveling mode being a traveling mode in which the first engagement device and the second engagement device are disengaged to perform traveling by the second rotating machine.

In the control device according to the aspect of the present disclosure, the electronic control unit may control the first rotating machine so as to stop the engine at a rotation angle appropriate for an engine restart after a stop of the engine or immediately before a stop of the engine.

In the control device according to the aspect of the present disclosure, the predetermined vehicle speed may be a lower limit value of a speed range in which a rotation speed of the first rotating machine exceeds an allowable value during the engine stop control, in a case where the engine stop control is executed in a state of the first traveling mode, or a value in the vicinity of the lower limit value.

According to the aspect of the present disclosure, when executing the engine stop control during traveling in the first traveling mode, when the vehicle speed is equal to or higher than a predetermined vehicle speed, there is a case where the rotation speed of the first rotating machine becomes overspeed. In the case as described above, the overspeed of the first rotating machine can be prevented by executing the engine stop control by performing switching from traveling in the first traveling mode to traveling in the second traveling mode.

According to the aspect of the present disclosure, in a case where the rotation speed of the engine does not increase in a case of passing through the third traveling mode in a transition period in which the switching from the first traveling mode to the second traveling mode is performed, by passing through the third traveling mode, it is possible to suppress a shock occurring during the switching from the first traveling mode to the second traveling mode while preventing an increase in the rotation speed of the engine during the engine stop control.

According to the aspect of the present disclosure, when the engine stops, by performing the switching to the fourth traveling mode in which traveling is performed by the second rotating machine, it is possible to suppress corotation of the engine and the first rotating machine during traveling.

According to the aspect of the present disclosure, the engine is stopped at a rotation angle suitable for an engine restart after the stop of the engine or immediately before the stop of the engine, and therefore, the engine can be appropriately started at the time of the next engine restart.

According to the aspect of the present disclosure, the predetermined vehicle speed is set to a lower limit value of a speed range in which a rotation speed of the first rotating machine exceeds an allowable value during the engine stop control, in a case where the engine stop control is executed in the state of the first traveling mode, or a value in the vicinity of the lower limit value, whereby solely in a case where the rotation speed of the first rotating machine exceeds the allowable value, it is possible to execute the engine stop control according to the vehicle speed by performing the switching to the second traveling mode.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 3 is a table showing each operating state of each engagement device in each traveling mode;

DETAILED DESCRIPTION OF EMBODIMENTS

Hereinafter, an embodiment of the present disclosure will be described in detail with reference to the drawings. In the following embodiment, the drawings are appropriately simplified or modified, and the dimensional ratios, shapes, and the like of the respective parts are not always drawn accurately.

Figure 1:
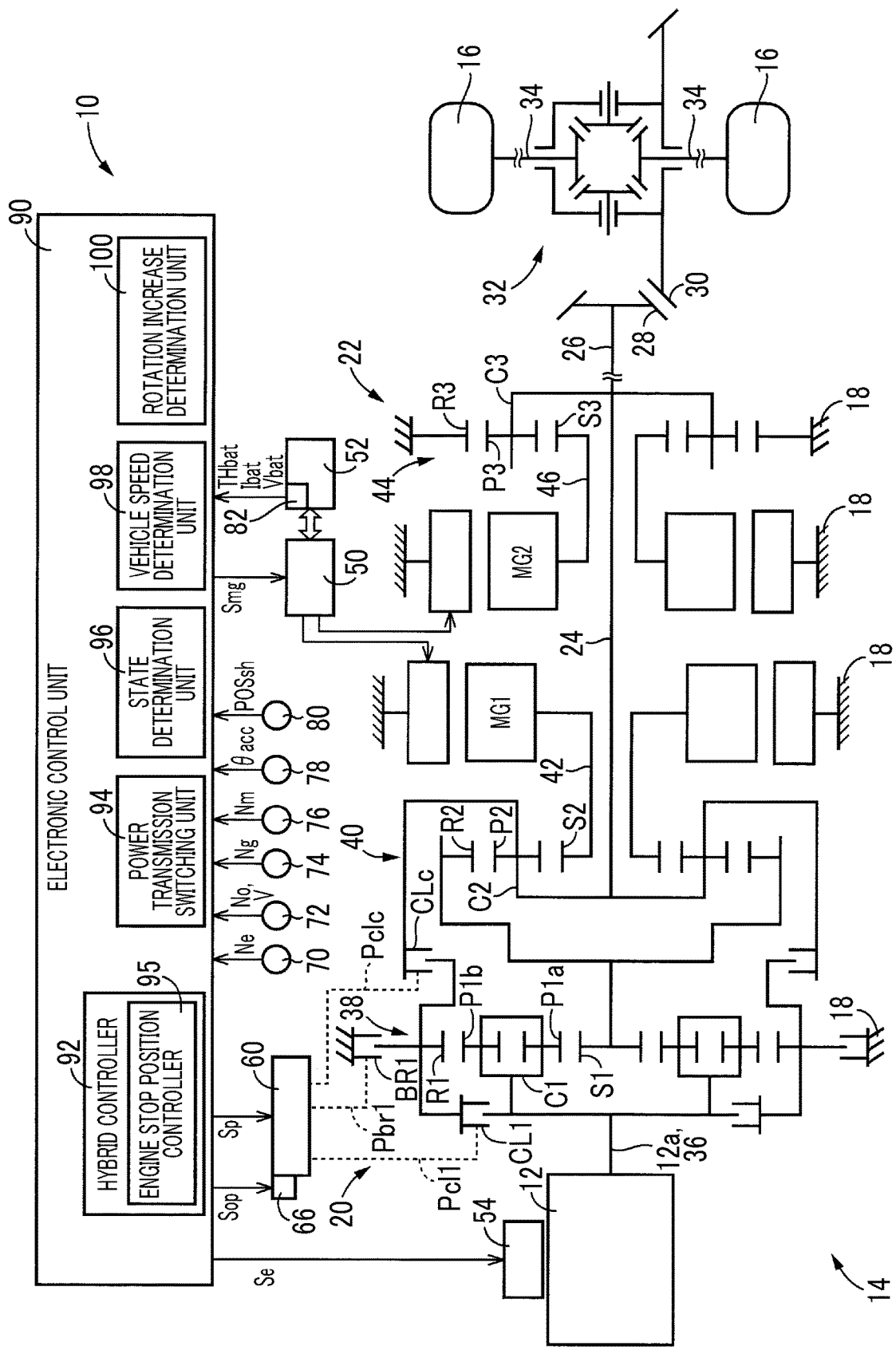
FIG. 1 is a diagram for describing a schematic configuration of each part relating to traveling of a vehicle to which the present disclosure is applied, and is a diagram for describing a main part of a control system for controlling each part.

FIG. 1 is a diagram for describing a schematic configuration of each part relating to traveling of a vehicle 10 to which the present disclosure is applied, and is a diagram for describing a main part of a control system for controlling each part. In FIG. 1, the vehicle 10 is a hybrid vehicle that is provided with an engine 12, a first rotating machine MG1, and a second rotating machine MG2, which can become a power source for traveling, a power transmission device 14, and drive wheels 16. The engine 12 corresponds to an engine in the present disclosure.

The engine 12 is a known internal combustion engine that outputs power by burning predetermined fuel, such as a gasoline engine or a diesel engine, for example. In the engine 12, engine torque Te is controlled by controlling an operating state such as a throttle opening degree, an intake air amount, a fuel supply amount, or an ignition timing by an electronic control unit 90 (described later).

The first rotating machine MG1 and the second rotating machine MG2 are so-called motor generators each having a function as an electric motor (a motor) that generates drive torque and a function as a power generator (a generator). The first rotating machine MG1 and the second rotating machine MG2 are connected to a battery unit 52 provided in the vehicle 10 as an electrical storage device that gives and receives electric power, through an electric power control unit 50 provided in the vehicle 10 and having an inverter unit, a smoothing capacitor, or the like, and the electric power control unit 50 is controlled by the electronic control unit 90 (described later), whereby MG1 torque Tg and MG2 torque Tm, which are respective output torque (powering torque or regenerative torque) of the first rotating machine MG1 and the second rotating machine MG2, are controlled.

The power transmission device 14 is provided in a power transmission path between the engine 12 and the drive wheels 16. The power transmission device 14 is provided with the first rotating machine MG1, the second rotating machine MG2, a first power transmission part 20, a second power transmission part 22, and the like in a case 18 that is a non-rotating member mounted on a vehicle body. The power transmission device 14 is provided with a propeller shaft 26 connected to an output shaft 24 that is an output rotating member of the first power transmission part 20, a drive pinion 28 connected to the propeller shaft 26, a differential gear 32 that meshes with the drive pinion 28 through a differential ring gear 30, a drive shaft 34 connected to the differential gear 32, and the like.

The first power transmission part 20 is disposed coaxially with an input shaft 36 that is an input rotating member of the first power transmission part 20 and is connected to a crankshaft 12a of the engine 12, and is provided with a first differential mechanism 38, a second differential mechanism 40, the first rotating machine MG1, a clutch CL1, a brake BR1, a clutch CLc, and the like.

The first differential mechanism 38 is a known double pinion type planetary gear mechanism having a first sun gear S1, a plurality of pairs of first pinion gears P1a, P1b, a first carrier C1, and a first ring gear R1, and functions as a differential mechanism that generates a differential operation. The first pinion gears P1a, P1b mesh with each other, the first carrier C1 supports the first pinion gears P1a, P1b such that the first pinion gears P1a, P1b can rotate and revolve, and the first ring gear R1 meshes with the first sun gear S1 through the first pinion gears P1a, P1b. The first differential mechanism 38 adopts a double pinion type planetary gear mechanism in consideration of appropriateness of a gear ratio ρ1 (a gear ratio ρ will be described later), for example. The second differential mechanism 40 is a known single pinion type planetary gear mechanism having a second sun gear S2, a second pinion gear P2, a second carrier C2 that supports the second pinion gear P2 such that the second pinion gear P2 can rotate and revolve, and a second ring gear R2 that meshes with the second sun gear S2 through the second pinion gear P2, and functions as a differential mechanism that generates a differential operation.

In the first differential mechanism 38, the first carrier C1 is a first rotation element RE1 that is integrally connected to the input shaft 36 and connected so as to transmit power to the engine 12 through the input shaft 36, and functions as an input rotating member of the first differential mechanism 38. The first ring gear R1 is a second rotation element RE2 that is selectively connected to the case 18 through the brake BR1. The first sun gear S1 is a third rotation element RE3 connected to an input rotating member of the second differential mechanism 40 (that is, the second ring gear R2 of the second differential mechanism 40) and functions as an output rotating member of the first differential mechanism 38.

In the second differential mechanism 40, the second sun gear S2 is a fourth rotation element RE4, which is a reaction force element that is integrally connected to a rotor shaft 42 of the first rotating machine MG1 and connected so as to transmit power to the first rotating machine MG1. The second carrier C2 is a fifth rotation element RE5, which is an output element that is connected to the output shaft 24 (that is, provided so as to integrally rotate with the output shaft 24) and connected to the drive wheels 16, and functions as an output rotating member of the second differential mechanism 40. The second ring gear R2 is a sixth rotation element RE6, which is an input element connected to the output rotating member of the first differential mechanism 38 (that is, the first sun gear S1 of the first differential mechanism 38) and functions as an input rotating member of the second differential mechanism 40.

The first carrier C1 and the first ring gear R1 are selectively connected to each other through the clutch CL1. The first ring gear R1 and the second carrier C2 are selectively connected to each other through the clutch CLc. Therefore, the clutch CL1 is a first engagement device that selectively connects the first rotation element RE1 and the second rotation element RE2. The clutch CLc is a second engagement device that selectively connects the second rotation element RE2 and the fifth rotation element RE5. The clutch CL1, the brake BR1, and the clutch CLc are preferably wet type frictional engagement devices and are multi-plate type hydraulic frictional engagement devices that are engaged and controlled by a hydraulic actuator.

Figure 2:
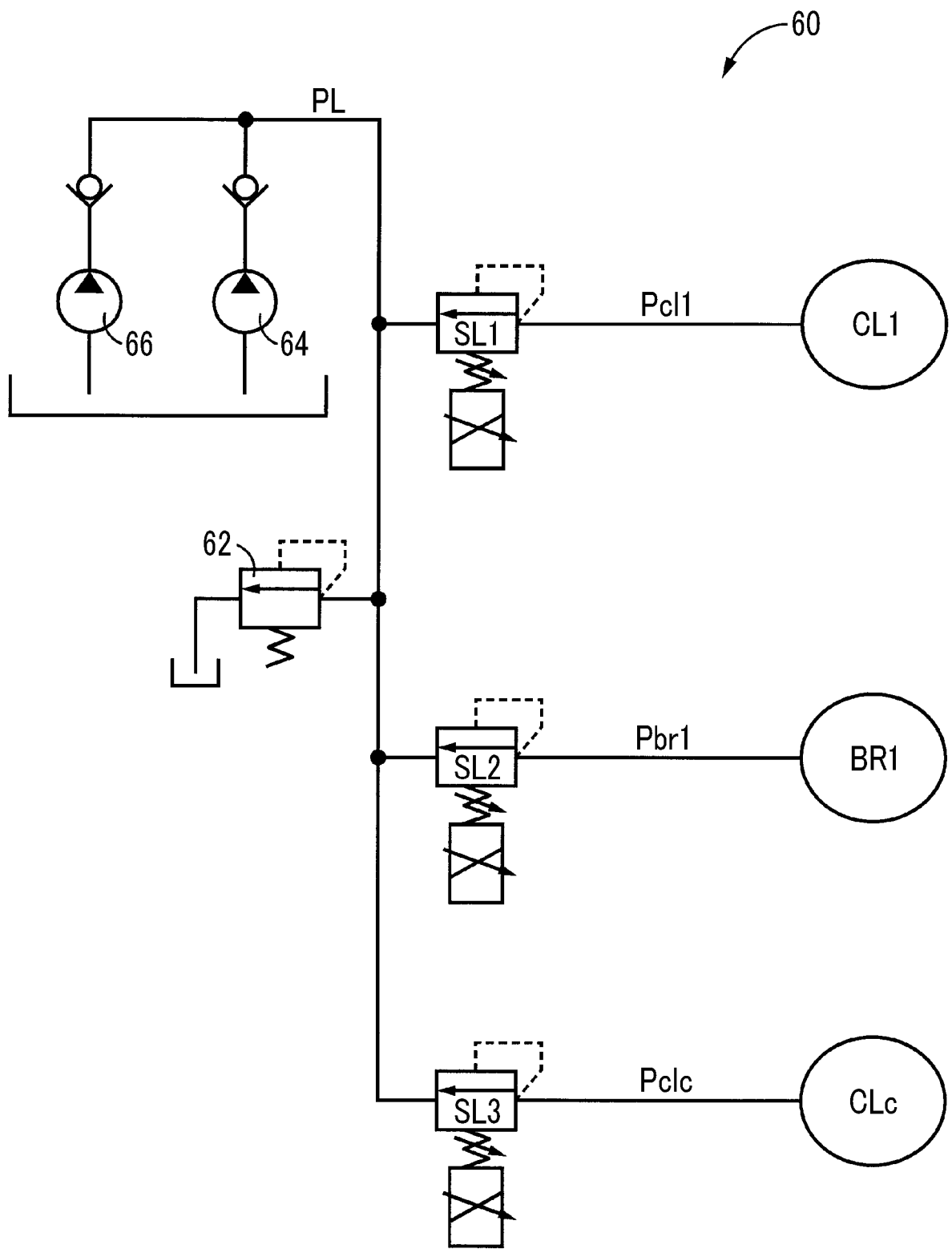
FIG. 2 is a diagram showing an example of a hydraulic pressure control circuit that controls an operating state of an engagement device.

FIG. 2 is a diagram showing an example of a main part of a hydraulic pressure control circuit 60 that is provided in the vehicle 10 and controls the operating states (states such as engagement and disengagement) of the respective engagement devices (the clutch CL1, the brake BR1, and the clutch CLc). In FIG. 2, the hydraulic pressure control circuit 60 is provided with a primary regulator valve 62, linear solenoid valves SL1, SL2, SL3, and the like. The primary regulator valve 62 regulates line hydraulic pressure PL by using hydraulic pressure that is generated by a mechanical type oil pump 64 (also referred to as an MOP 64) provided in the vehicle 10 as source pressure or using hydraulic pressure that is generated by an electric type oil pump 66 (also referred to as an EOP 66) provided in the vehicle 10 as source pressure. The MOP 64 is connected to, for example, any one rotating member (or a rotation element) of the power transmission device 14, which rotates according to the rotation of the engine 12, and is rotationally driven by the engine 12 to supply hydraulic pressure. The EOP 66 supplies hydraulic pressure by being rotationally driven by a dedicated motor (not shown) that is controlled by an electronic control unit 90 (described later), for example, at the time of the stop of rotation of the engine 12 (for example, at the time of motor traveling in which the operation of the engine 12 is stopped). The linear solenoid valve SL1 regulates engagement hydraulic pressure (also referred to as CL1 hydraulic pressure Pcl1) that is supplied to the clutch CL1, by using the line hydraulic pressure PL as source pressure. The linear solenoid valve SL2 regulates engagement hydraulic pressure (also referred to as BR1 hydraulic pressure Pbr1) that is supplied to the brake BR1, by using the line hydraulic pressure PL as source pressure. The linear solenoid valve SL3 regulates engagement hydraulic pressure (also referred to as CLc hydraulic pressure Pclc) that is supplied to the clutch CLc, by using the line hydraulic pressure PL as source pressure. The linear solenoid valves SL1, SL2, SL3 basically have the same configuration and are independently subjected to excitation, non-excitation, or current control by the electronic control unit 90 to independently regulate the hydraulic pressures Pcl1, Pbr1, Pclc. The operating state of each of the engagement devices (the clutch CL1, the brake BR1, and the clutch CLc) is switched according to each of the hydraulic pressures Pcl1, Pbr1, Pclc that are supplied from the hydraulic pressure control circuit 60.

Returning to FIG. 1, in the first differential mechanism 38, by switching each of the operating states of the clutch CL1 and the brake BR1, it is possible to form four states: a direct connection state, a reverse rotation speed change state of the engine 12, a neutral state, and an internal lock state. Specifically, in the engaged state of the clutch CL1, the first differential mechanism 38 enters the direct connection state where the rotation elements of the first differential mechanism 38 are integrally rotated. In the engaged state of the brake BR1, the first differential mechanism 38 enters the reverse rotation speed change state of the engine 12 where the rotation of the first ring gear R1 becomes zero [rpm] and the first sun gear S1 (the output rotating member of the first differential mechanism 38) rotates in negative rotation with respect to positive rotation of an engine rotation speed Ne. In the disengaged state of the clutch CL1 and the disengaged state of the brake BR1, the first differential mechanism 38 enters the neutral state where the differential operation of the first differential mechanism 38 is permitted. In the engaged state of the clutch CL1 and the engaged state of the brake BR1, the first differential mechanism 38 enters the internal lock state where the rotation of each rotation element of the first differential mechanism 38 is stopped.

In a state where the differential operation is permitted, the second differential mechanism 40 can function as a power split device that divides (or distributes) the power of the engine 12, which is input to the second ring gear R2, into the first rotating machine MG1 and the second carrier C2. Therefore, in the vehicle 10, the reaction force of the engine torque Te that is input to the second ring gear R2 is taken in the first rotating machine MG1, whereby it is possible to perform engine traveling with direct-transmission torque (also referred to as engine direct-transmission torque) that is transmitted to the second carrier C2, and MG2 torque Tm by the second rotating machine MG2 that is driven with the generated electric power of the first rotating machine MG1 by the power divided into the first rotating machine MG1. By the above, the second differential mechanism 40 functions as a known electric type differential part (electric type continuously variable transmission) that controls a gear ratio (a change gear ratio) by controlling the operating state of the first rotating machine MG1 by the control of the electric power control unit 50 by the electronic control unit 90 (described later). That is, the second differential mechanism 40 is an electric type transmission mechanism in which a differential state is controlled by controlling the operating state of the first rotating machine MG1.

In the first power transmission part 20, it is possible to configure an electric type continuously variable transmission that operates at a power split ratio different from the power split ratio in the second differential mechanism 40. That is, in the first power transmission part 20, in addition to the connection of the first sun gear S1 (the third rotation element RE3) and the second ring gear R2 (the sixth rotation element RE6), the first ring gear R1 (the second rotation element RE2) and the second carrier C2 (the fifth rotation element RE5 are connected by bringing the clutch CLc into the engaged state, whereby one differential mechanism is configured with the first differential mechanism 38 and the second differential mechanism 40, and it is possible to make the entirety of the first differential mechanism 38 and the second differential mechanism 40 function as an electric type continuously variable transmission that operates at a power split ratio different from the power split ratio in the second differential mechanism 40 alone.

In the first power transmission part 20, the first differential mechanism 38 and the second differential mechanism 40, in which the four states described above are formed, are connected to each other, and thus the vehicle 10 can realize a plurality of traveling modes (described later) in conjunction with the switching of the operating state of the clutch CLc.

In the first power transmission part 20 that is configured as described above, the power of the engine 12 or the power of the first rotating machine MG1 is transmitted to the output shaft 24. Therefore, the engine 12 and the first rotating machine MG1 are connected so as to transmit power to the drive wheels 16 through the first power transmission part 20.

The second power transmission part 22 is disposed coaxially with the input shaft 36 (or the output shaft 24) and is provided with the second rotating machine MG2 and a reduction mechanism 44 connected to the output shaft 24. The reduction mechanism 44 is a known single pinion type planetary gear mechanism having a third sun gear S3, a third pinion gear P3, a third carrier C3 that supports the third pinion gear P3 such that the third pinion gear P3 can rotate and revolve, and a third ring gear R3 that meshes with the third sun gear S3 through the third pinion gear P3. The third sun gear S3 is an input element connected to a rotor shaft 46 of the second rotating machine MG2. The third ring gear R3 is a reaction force element connected to the case 18. The third carrier C3 is an output element connected to the output shaft 24. The reduction mechanism 44 configured as described above reduces an MG2 rotation speed Nm and transmits it to the output shaft 24. By the above, in the second power transmission part 22, the power of the second rotating machine MG2 is transmitted to the output shaft 24 without passing through the first power transmission part 20. Therefore, the second rotating machine MG2 is connected so as to transmit power to the drive wheels 16 without passing through the first power transmission part 20. That is, the second rotating machine MG2 is a rotating machine connected so as to transmit power to the drive shaft 34, which is an output rotating member of the power transmission device 14, without passing through the first power transmission part 20. The output rotating member of the power transmission device 14 is an output rotating member that is connected to the drive wheels 16, and the same applies to the output shaft 24, the propeller shaft 26, or the like, in addition to the drive shaft 34.

The power transmission device 14 configured as described above is suitably used for a front engine and rear drive (FR) type vehicle. In the power transmission device 14, the power of the engine 12, the power of the first rotating machine MG1, or the power of the second rotating machine MG2 is transmitted to the output shaft 24 and transmitted from the output shaft 24 to the drive wheels 16 through the differential gear 32, the drive shaft 34, and the like in sequence.

The vehicle 10 is provided with the electronic control unit 90 as a controller that includes a control device of the vehicle 10, which is related to the control of the engine 12, the power transmission device 14, and the like. The electronic control unit 90 is configured to include a so-called microcomputer provided with, for example, a central processing unit (CPU), a random access memory (RAM), a read-only memory (ROM), an input/output interface, and the like, and the CPU executes various control of the vehicle 10 by performing signal processing according to a program stored in the ROM in advance, while utilizing a temporary storage function of the RAM. For example, the electronic control unit 90 is made so as to execute output control of each of the engine 12, the first rotating machine MG1, and the second rotating machine MG2, switching control of a traveling mode (described later), and the like, and is configured to be divided into uses for engine control, rotating machine control, hydraulic pressure control, and the like as needed.

Various signals or the like (for example, the engine rotation speed Ne, an output rotation speed No that is the rotation speed of the output shaft 24, which corresponds to a vehicle speed V, an MG1 rotation speed Ng, the MG2 rotation speed Nm, an accelerator operation amount θacc, a shift lever operating position (shift position) POSsh such as "P", "R", "N", and "D", a battery temperature THbat of the battery unit 52, a battery charge/discharge current Ibat, battery voltage Vbat, and the like) based on the detection values by various sensors or the like (for example, an engine rotation speed sensor 70, an output rotation speed sensor 72, an MG1 rotation speed sensor 74 such as a resolver, an MG2 rotation speed sensor 76 such as a resolver, an accelerator operation amount sensor 78, a shift position sensor 80, a battery sensor 82, and the like) provided in the vehicle 10 are supplied to the electronic control unit 90. The engine rotation speed sensor 70 also functions as a crank position sensor of the engine 12, and a crank angle (a crank position) of the engine 12 is also likewise detected as needed.

Various command signals (for example, an engine control command signal Se for controlling the engine 12, a rotating machine control command signal Smg for controlling each of the first rotating machine MG1 and the second rotating machine MG2, a hydraulic pressure control command signal Sp for controlling the operating state of each of the engagement devices (the clutch CL1, the brake BR1, and the clutch CLc), a pump drive control command signal Sop for driving the EOP 66, and the like) are output from the electronic control unit 90 to the respective devices (for example, an engine control device 54 such as a throttle actuator, a fuel injection device, or an ignition device, the electric power control unit 50, the hydraulic pressure control circuit 60, the EOP 66, and the like) provided in the vehicle 10. The electronic control unit 90 calculates charging capacity SOC (also referred to as battery capacity SOC) of the battery unit 52 as a value indicating the state of charge of the battery unit 52, based on the battery charge/discharge current Ibat, the battery voltage Vbat, and the like, for example.

The electronic control unit 90 functionally includes hybrid control means, that is, a hybrid controller 92 and power transmission switching means, that is, a power transmission switching unit 94, in order to realize a control function for various control in the vehicle 10.

The hybrid controller 92 controls the opening and closing of an electronic throttle valve, controls the fuel injection amount or the injection timing, outputs the engine control command signal Se for controlling the ignition timing, and executes the output control of the engine 12 such that the target torque of the engine torque Te is obtained. The hybrid controller 92 outputs the rotating machine control command signal Smg for controlling the operation of the first rotating machine MG1 or the second rotating machine MG2 to the electric power control unit 50, and executes the output control of the first rotating machine MG1 or the second rotating machine MG2 such that the target torque of the MG1 torque Tg or the MG2 torque Tm is obtained.

The hybrid controller 92 calculates a request drive torque, based on the accelerator operation amount eacc and the vehicle speed V, and generates the request drive torque from at least one of the engine 12, the first rotating machine MG1, and the second rotating machine MG2 so as to achieve operation of low fuel consumption and low exhaust gas amount in consideration of a charge request value (charge request power).

The hybrid controller 92 selectively establishes a motor traveling (EV traveling) mode and a hybrid traveling (HV traveling) mode (also referred to as an engine traveling mode) as a traveling mode according to a traveling state. The EV traveling mode is a control mode that enables motor traveling in which traveling is performed using at least one of the first rotating machine MG1 and the second rotating machine MG2 as a power source for traveling, in a state where the operation of the engine 12 is stopped. The HV traveling mode is a control mode that enables HV traveling (engine traveling) in which traveling is performed using at least the engine 12 as a power source for traveling (that is, traveling is performed by transmitting the power of the engine 12 to the drive wheels 16). Like a mode in which the power of the engine 12 is converted into electric power by power generation of the first rotating machine MG1 and the converted electric power is exclusively charged to the battery unit 52, a mode that is not premised on traveling of the vehicle 10 is also included in the HV traveling mode, because the engine 12 is in a state of being operated.

The power transmission switching unit 94 controls the operating state of each of the clutch CL1, the brake BR1, and the clutch CLc, based on the traveling mode established by the hybrid controller 92. The power transmission switching unit 94 outputs a hydraulic pressure control command signal Sp for at least one of engaging or disengaging each of the clutch CL1, the brake BR1, and the clutch CLc to the hydraulic pressure control circuit 60 such that the power transmission for the traveling in the traveling mode established by the hybrid controller 92 becomes possible.

Here, traveling modes that can be executed in the vehicle 10 will be described using FIG. 3 and FIG. 4 to FIG. 16. FIG. 3 is a table showing the operating states of the clutch CL1, the brake BR1, and the clutch CLc in each traveling mode. A mark O in the table of FIG. 3 indicates engagement of each of the engagement devices (the clutch CL1, the brake BR1, and the clutch CLc), a blank indicates disengagement, and a mark Δ indicates that there is a case where either one is engaged or both sides are engaged, according to a situation when an engine brake that brings the engine 12 in an operation stop state into a corotation state is used together. "G" indicates that the rotating machine (MG1, MG2) is made to function mainly as a generator, and "M" indicates that the rotating machine (MG1, MG2) is made to function mainly as a motor during drive and function mainly as a generator during regeneration. As shown in FIG. 3, the vehicle 10 can selectively realize the EV traveling mode and the HV traveling mode as a traveling mode. The EV traveling mode has two modes; a single drive EV mode that is a control mode in which the motor traveling using the second rotating machine MG2 as a single power source is possible, and a dual drive EV mode that is a control mode in which the motor traveling using the first rotating machine MG1 and the second rotating machine MG2 as power sources is possible. The HV traveling mode has three modes; an overdrive (O/D) input split mode (hereinafter referred to as an O/DHV mode), an under drive (U/D) input split mode (hereinafter referred to as a U/DHV mode), and a fixed stage mode.

FIG. 4 to FIG. 16 are collinear diagrams capable of relatively showing the rotation speeds of the respective rotation elements RE1 to RE6 in each of the first differential mechanism 38 and the second differential mechanism 40. In the collinear diagrams, in vertical lines Y1 to Y4 representing the rotation speeds of the respective rotation elements, in order from the left side of the plane of the drawing, the vertical line Y1 represents the rotation speed of the second sun gear S2 that is the fourth rotation element RE4 to which the first rotating machine MG1 is connected, the vertical line Y2 represents the rotation speed of the first carrier C1 that is the first rotation element RE1 to which the engine 12 (refer to "ENG" in the drawing) is connected, the vertical line Y3 represents the rotation speed of the first ring gear R1 that is the second rotation element RE2 that is selectively connected to the case 18 through the brake BR1, and the rotation speed of the second carrier C2 that is the fifth rotation element RE5 connected to the output shaft 24 (refer to "OUT" in the drawing), and the vertical line Y4 represents the rotation speeds of the first sun gear S1 that is the third rotation element RE3 and the second ring gear R2 that is the sixth rotation element RE6, which are connected to each other. The second rotating machine MG2 is connected to the output shaft 24 through the reduction mechanism 44.

An arrow in a white square mark (□) represents the MG1 torque Tg, an arrow in a white circle mark (○) represents the engine torque Te, and an arrow in a black circle mark (●) represents the MG2 torque Tm. The clutch CL1 that selectively connects the first carrier C1 and the first ring gear R1 being outlined shows the disengaged state of the clutch CL1, and the clutch CL1 being represented by hatching (oblique lines) shows the engaged state of the clutch CL1. A white diamond mark (◇) in the brake BR1 that selectively connects the first ring gear R1 to the case 18 represents the disengaged state of the brake BR1, and a black diamond mark (◆) represents the engaged state of the brake BR1. A white diamond mark (◇) in the clutch CLc that selectively connects the first ring gear R1 and the second carrier C2 represents the disengaged state of the clutch CLc, and a black diamond mark (◆) represents the engaged state of the clutch CLc.

A straight line relatively representing the rotation speed relating to the first differential mechanism 38 is shown by a broken line, and a straight line relatively representing the rotation speed relating to the second differential mechanism 40 is shown by a solid line. An arrow in the black circle mark (●) is at least one of the generated electric power of the first rotating machine MG1 by the power of the engine 12 divided into the first rotating machine MG1 or the MG2 torque Tm by the second rotating machine MG2 that is driven by the electric power that is supplied from the battery unit 52, and does not include the engine direct-transmission torque. The black diamond mark (◆) in the clutch CLc is not shown in the drawing, because it overlaps the black circle mark (●). The mutual intervals of the vertical lines Y1, Y2, Y3, Y4 are determined according to the gear ratios ρ1, ρ2 of the differential mechanisms 38, 40. When the distance between the sun gear and the carrier is a distance corresponding to "1" in the relationship between the vertical axes of the collinear diagram, the distance between the carrier and the ring gear is a distance corresponding to the gear ratio ρ (=the number of teeth of the sun gear/the number of teeth of the ring gear) of the planetary gear mechanism.

Figure 4:
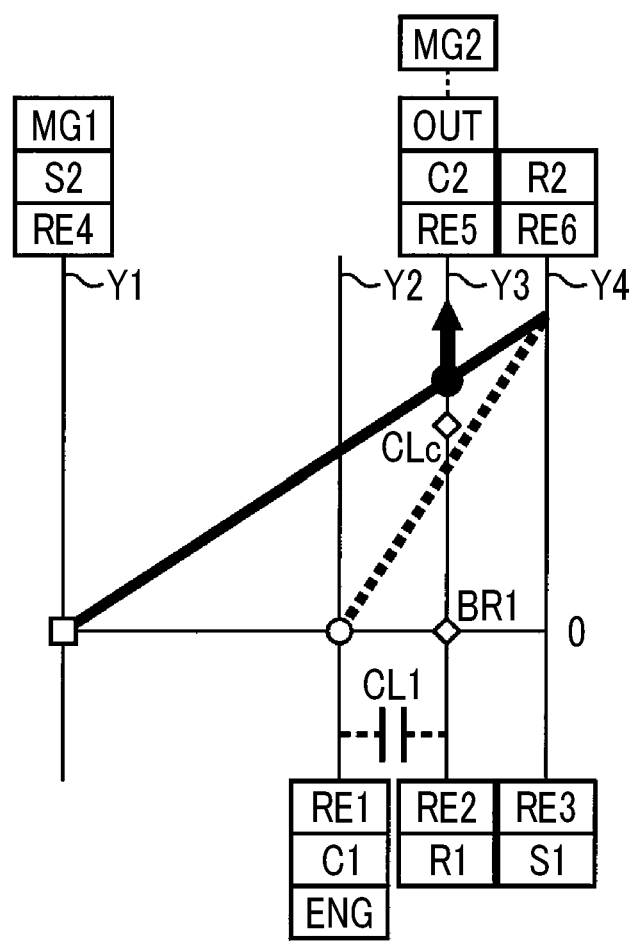
FIG. 4 is a collinear diagram in a single drive EV mode.

FIG. 4 is a collinear diagram in the single drive EV mode. The single drive EV mode is realized in a state where the clutch CL1, the brake BR1, and the clutch CLc are disengaged, as shown in "NORMAL" of FIG. 3. In the single drive EV mode, the clutch CL1 and the brake BR1 are disengaged, the differential operation of the first differential mechanism 38 is permitted, and the first differential mechanism 38 enters the neutral state. The hybrid controller 92 stops the operation of the engine 12 and causes the second rotating machine MG2 to output the MG2 torque Tm for traveling. FIG. 4 shows a case at the time of a forward movement in which the second rotating machine MG2 outputs positive torque in a positive rotation (that is, the rotation direction of the second carrier C2 at the time of the forward movement of the vehicle 10). At the time of the backward movement, the second rotating machine MG2 is reversely rotated with respect to the time of the forward movement. During the traveling of the vehicle, the second carrier C2 connected to the output shaft 24 is rotated in conjunction with the rotation of the second rotating machine MG2 (here, also including the rotation of the drive wheels 16). In the single drive EV mode, since the clutch CLc is also disengaged, the engine 12 and the first rotating machine MG1 are not corotated and it is possible to make the engine rotation speed Ne and the MG1 rotation speed Ng zero. By the above, it is possible to reduce a drag loss in each of the engine 12 and the first rotating machine MG1, thereby improving an electricity cost (that is, suppressing electric power consumption). The hybrid controller 92 maintains the MG1 rotation speed Ng at zero by feedback control. Alternatively, the hybrid controller 92 maintains the MG1 rotation speed Ng at zero by executing control (d-axis lock control) of causing an electric current to flow through the first rotating machine MG1 such that the rotation of the first rotating machine MG1 is fixed. Alternatively, even though the MG1 torque Tg is zero, when the MG1 rotation speed Ng can be maintained at zero by cogging torque of the first rotating machine MG1, there is no need to add the MG1 torque Tg. The single drive EV mode is a fourth traveling mode in which it is possible to perform the motor traveling by using solely the second rotating machine MG2 as a power source in a state where the clutch CL1 and the clutch CLc are disengaged (a first traveling mode, a second traveling mode, and a third traveling mode will be described later). Even though control that maintains the MG1 rotation speed Ng at zero is performed, the first power transmission part 20 is in the neutral state where the reaction force of the MG1 torque Tg is not taken, and therefore, the first power transmission part 20 does not affect the drive torque. In the single drive EV mode, the first rotating machine MG1 may be idled without a load.

Figure 5:
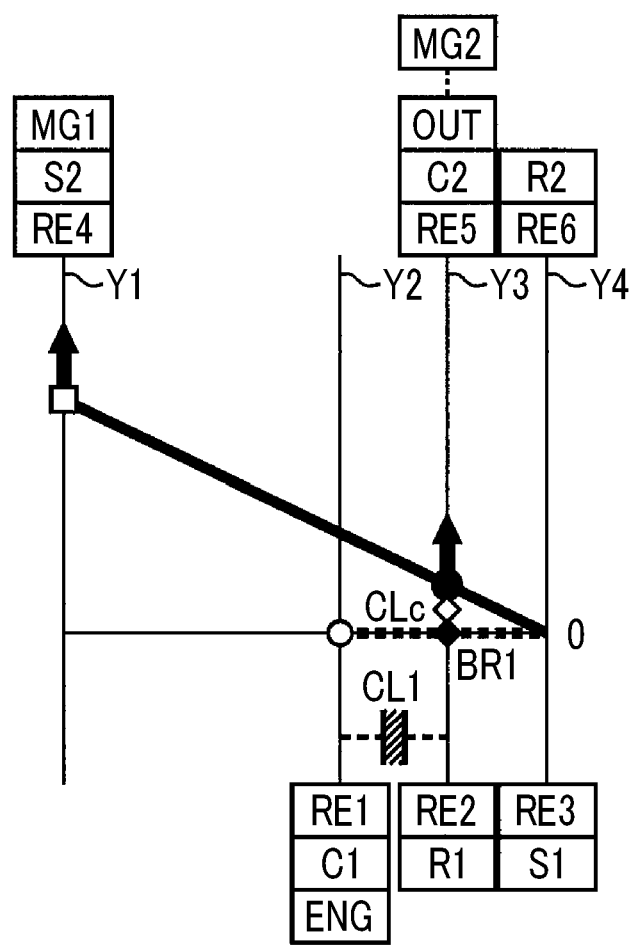
FIG. 5 is a collinear diagram in a dual drive EV mode.

FIG. 5 is a collinear diagram in the dual drive EV mode. The dual drive EV mode is realized in a state where the clutch CL1 and the brake BR1 are engaged and a state where the clutch CLc is disengaged, as shown in "DUAL DRIVE" of FIG. 3. In the dual drive EV mode, the clutch CL1 and the brake BR1 are engaged, the differential operation of the first differential mechanism 38 is restricted, and the rotation of the first ring gear R1 is stopped. For this reason, the rotation of any rotation element of the first differential mechanism 38 is stopped, and the first differential mechanism 38 enters the internal lock state. By the above, the engine 12 enters a stopped state at zero rotation, and the second ring gear R2 connected to the first sun gear S1 is also fixed at zero rotation. When the second ring gear R2 is fixed so as to be unable to rotate, since the reaction torque of the MG1 torque Tg is taken by the second ring gear R2, it is possible to output torque based on the MG1 torque Tg from the second carrier C2 and transmit the torque to the drive wheels 16. The hybrid controller 92 stops the operation of the engine 12 and causes the first rotating machine MG1 and the second rotating machine MG2 to output the MG1 torque Tg for traveling and the MG2 torque Tm for traveling, respectively. FIG. 5 shows a case at the time of a forward movement in which both the first rotating machine MG1 and the second rotating machine MG2 output positive torque in a positive rotation. At the time of a backward movement, the first rotating machine MG1 and the second rotating machine MG2 are reversely rotated with respect to the time of the forward movement.

As described using FIG. 4 and FIG. 5, in the single drive EV mode, the vehicle 10 can be driven by solely the second rotating machine MG2, and in the dual drive EV mode, the vehicle 10 can be driven by the first rotating machine MG1 and the second rotating machine MG2. Therefore, in the case of the motor traveling, at the time of a low load, the single drive EV mode is established, so that single traveling by the second rotating machine MG2 is performed, and at the time of a high load, the dual drive EV mode is established, so that dual drive by the first rotating machine MG1 and the second rotating machine MG2 is performed. Regeneration during the deceleration of the vehicle including the engine traveling is executed mainly by the second rotating machine MG2.

In a case where regenerative control is performed by the second rotating machine MG2 during the traveling in the single drive EV mode, the engine 12 in which the operation is stopped does not perform corotation and enters a stopped state at zero rotation, and therefore, a large amount of regeneration can be taken. On the other hand, when the battery unit 52 is in a fully charged state during the traveling in the single drive EV mode, regenerative energy cannot be taken, and therefore, it is not possible to obtain braking torque in regenerative brake. In a case where during the traveling in the single drive EV mode, the battery unit 52 enters the fully charged state and the regenerative energy cannot be taken, it is conceivable to obtain the braking torque in the engine brake or to use the engine brake together in a state where the battery unit 52 is close to full charge. From another viewpoint, when the battery capacity SOC is lowered during the traveling in the single drive EV mode and it becomes difficult to secure electric power that is supplied to the second rotating machine MG2, it is not possible to drive the second rotating machine MG2. In a case where the battery capacity SOC is lowered during the traveling in the single drive EV mode, switching to the engine traveling is considered. By the above, the EV traveling mode has a standby mode as preparation for quickly operating the engine brake or quickly performing the switching to the engine traveling, and an engine brake combined mode in which the engine brake is used together.

Figure 6:
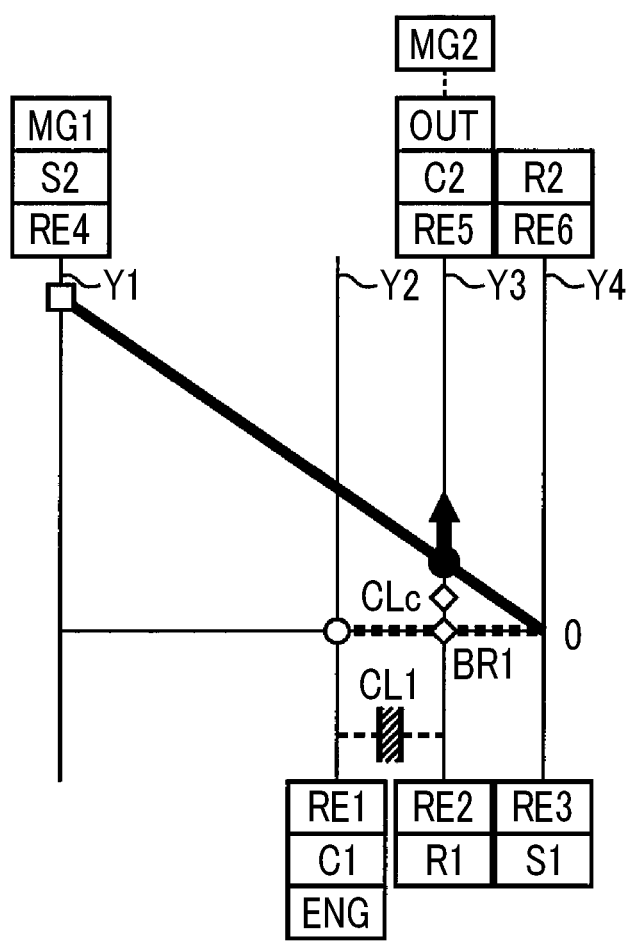
FIG. 6 is a collinear diagram in a standby mode in a U/D input split.
Figure 7:
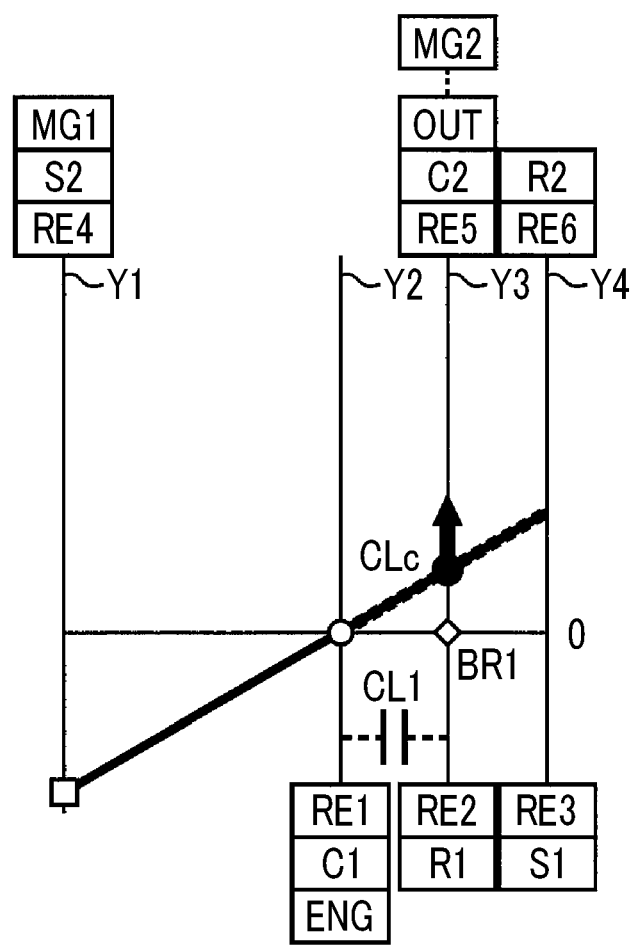
FIG. 7 is a collinear diagram in a standby mode in an O/D input split.

Each of FIG. 6 and FIG. 7 is a collinear diagram in the standby mode in the EV traveling mode. The standby mode is realized in a state where the clutch CL1 or the clutch CLc is engaged, as shown in "STANDBY MODE" of FIG. 3. When the clutch CL1 or the clutch CLc is engaged, the engine 12 can enter a corotation state. However, in the standby mode, the first rotating machine MG1 is idled without a load, and therefore, the engine 12 in which the operation is being stopped enters a stopped state at zero rotation. Therefore, in the standby mode, the motor traveling or the regenerative control can be performed by the second rotating machine MG2 without operating the engine brake. From the state of the standby mode, the engine rotation speed Ne is increased by the first rotating machine MG1 and the reaction force of the engine torque Te (negative value) is taken in the first rotating machine MG1, whereby it is possible to operate the engine brake according to the engine rotation speed Ne. From the state of the standby mode, the engine rotation speed Ne is increased by the first rotating machine MG1 to perform ignition, whereby it is possible to transition to the engine traveling.

The operating state of each of the engagement devices (the clutch CL1, the brake BR1, and the clutch CLc) in the standby mode in which the clutch CL1 is engaged, as shown in FIG. 6, is the same state as the operating state of each of the engagement devices in the forward traveling in the U/DHV mode of the HV traveling mode (described later). In the standby mode, the engine 12 is not operated. However, for convenience, the standby mode in which the clutch CL1 is engaged is referred to as a standby mode in the U/D input split.

The operating state of each of the engagement devices (the clutch CL1, the brake BR1, and the clutch CLc) in the standby mode in which the clutch CLc is engaged, as shown in FIG. 7, is the same state as the operating state of each of the engagement devices in the forward traveling in the O/DHV mode of the HV traveling mode (described later). For convenience, the standby mode in which the clutch CLc is engaged is referred to as a standby mode in the O/D input split.

Figure 8:
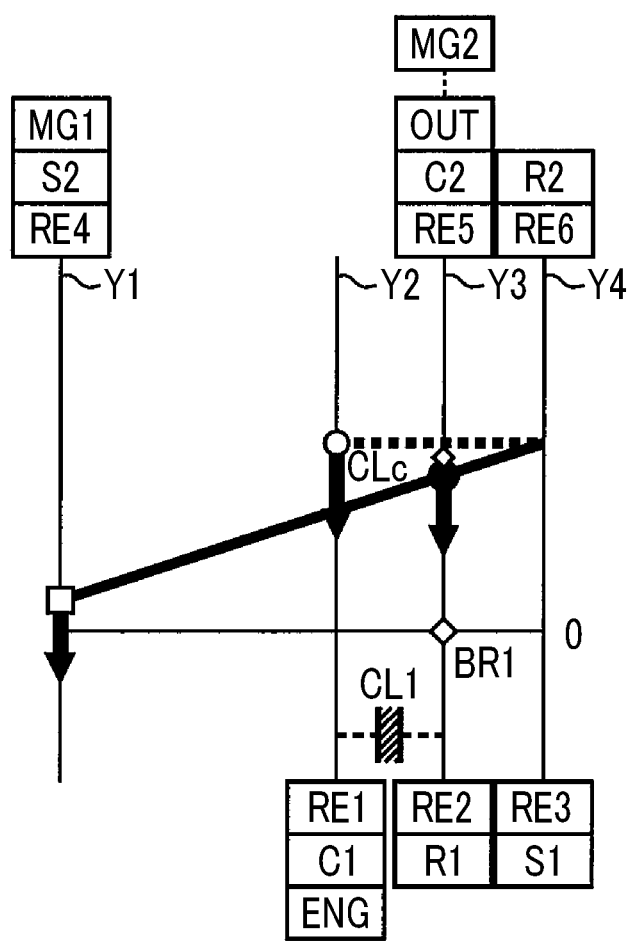
FIG. 8 is a collinear diagram in an engine brake combined mode in the U/D input split.
Figure 9:
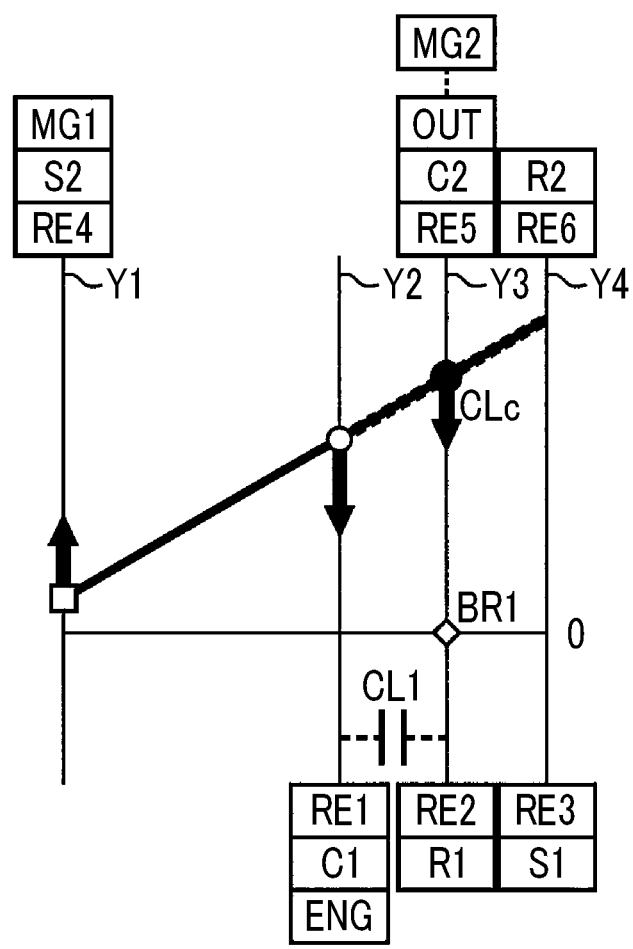
FIG. 9 is a collinear diagram in an engine brake combined mode in the O/D input split.

Each of FIG. 8 and FIG. 9 is a collinear diagram in the engine brake combined mode in the EV traveling mode. The engine brake combined mode is realized in a state where the clutch CL1 or the clutch CLc is engaged, as shown in "ENGINE BRAKE COMBINED" of FIG. 3. When the clutch CL1 or the clutch CLc is engaged, the engine 12 enter a corotation state, and therefore, in the engine brake combined mode, by taking the reaction force of the engine torque Te (negative value) while controlling the engine rotation speed Ne in the first rotating machine MG1, it is possible to operate the engine brake according to the engine rotation speed Ne. Therefore, in the engine brake combined mode, in addition to or in place of the regenerative brake by the second rotating machine MG2, the engine brake can be operated. It is possible to operate the engine brake even with the engagement of the clutch CL1 and the clutch CLc. In this case, there is no need to take the reaction force of the engine torque Te (negative value) in the first rotating machine MG1. The operating state of each of the engagement devices (the clutch CL1, the brake BR1, and the clutch CLc) in the engine brake combined mode in which the clutch CL1 and the clutch CLc are engaged is the same state as the operating state of each of the engagement devices in a direct connection fixed stage mode of the HV traveling mode (described later).

The operating state of each of the engagement devices (the clutch CL1, the brake BR1, and the clutch CLc) in the engine brake combined mode in which the clutch CL1 is engaged, as shown in FIG. 8, is the same state as the operating state of each of the engagement devices in the forward traveling in the U/DHV mode of the HV traveling mode (described later). In the engine brake combined mode, the engine 12 is not operated. However, for convenience, the engine brake combined mode in which the clutch CL1 is engaged is referred to as an engine brake combined mode in the U/D input split.

The operating state of each of the engagement devices (the clutch CL1, the brake BR1, and the clutch CLc) in the engine brake combined mode in which the clutch CLc is engaged, as shown in FIG. 9, is the same state as the operating state of each of the engagement devices in the forward traveling in the O/DHV mode of the HV traveling mode (described later). For convenience, the engine brake combined mode in which the clutch CLc is engaged is referred to as an engine brake combined mode in the O/D input split.

Figure 10:
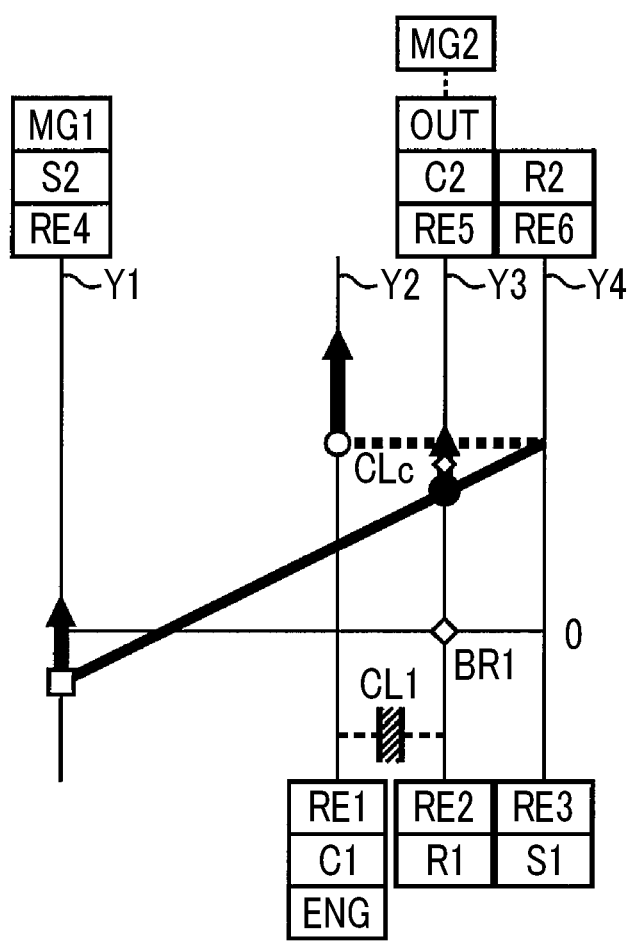
FIG. 10 is a collinear diagram in forward traveling in a U/DHV mode of an HV traveling mode.

FIG. 10 is a collinear diagram in the forward traveling in the U/DHV mode of the HV traveling mode. The forward traveling of the U/DHV mode (hereinafter referred to as a U/DHV mode (forward movement)) is realized in a state where the clutch CL1 is engaged and a state where the brake BR1 and the clutch CLc are disengaged, as shown in "FORWARD MOVEMENT" of "U/D INPUT SPLIT" of FIG. 3. In the U/DHV mode (forward movement), the clutch CL1 is engaged, the brake BR1 is disengaged, and the first differential mechanism 38 enters the direct connection state. Therefore, the power of the engine 12, which is input to the first carrier C1, is directly transmitted to the second ring gear R2 connected to the first sun gear S1. In addition, in the U/DHV mode (forward movement), the clutch CLc is disengaged and an electric type continuously variable transmission is configured with the second differential mechanism 40 alone. By the above, in the first power transmission part 20, the power of the engine 12, which is input to the second ring gear R2, can be divided into the second sun gear S2 and the second carrier C2. That is, in the first power transmission part 20, the reaction force of the engine torque Te that is input to the second ring gear R2 is taken in the first rotating machine MG1, whereby the engine direct-transmission torque is transmitted to the second carrier C2 and the generated electric power of the first rotating machine MG1 by the power of the engine 12 divided into the first rotating machine MG1 is transmitted to the second rotating machine MG2 through a predetermined electric path. The hybrid controller 92 causes the engine 12 to operate (activate), and also causes the MG1 torque Tg, which is the reaction force torque to the engine torque Te, to be output by the power generation of the first rotating machine MG1 and causes the MG2 torque Tm to be output from the second rotating machine MG2 by the generated electric power of the first rotating machine MG1. The hybrid controller 92 can also drive the second rotating machine MG2 by adding electric power that is supplied from the battery unit 52 to the generated electric power of the first rotating machine MG1. FIG. 10 shows a case where the second rotating machine MG2 outputs positive torque in a positive rotation, so that forward traveling is performed.

Figure 11:
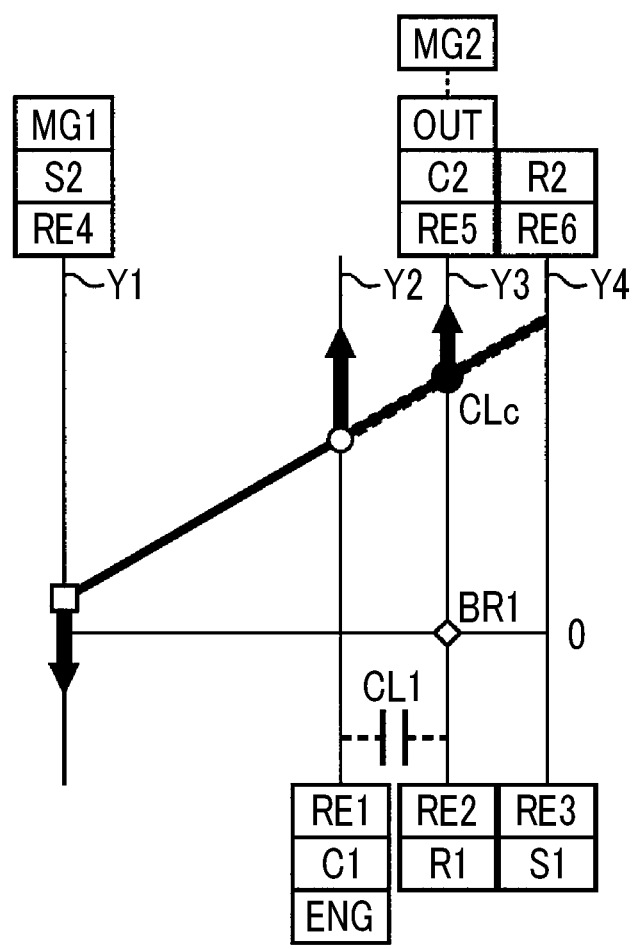
FIG. 11 is a collinear diagram in forward traveling in an O/DHV mode of the HV traveling mode.

FIG. 11 is a collinear diagram in the forward traveling in the O/DHV mode of the HV traveling mode. The forward traveling of the O/DHV mode (hereinafter referred to as an O/DHV mode (forward movement)) is realized in a state where the clutch CL1 and the brake BR1 are disengaged and a state where the clutch CLc is engaged, as shown in "FORWARD MOVEMENT" of "O/D INPUT SPLIT" of FIG. 3. In the O/DHV mode (forward movement), the clutch CLc is engaged and a single differential mechanism is configured with the first differential mechanism 38 and the second differential mechanism 40. In addition, in the O/DHV mode (forward movement), the clutch CL1 and the brake BR1 are disengaged, and an electric type continuously variable transmission that operates at a power split ratio different from the power split ratio in the second differential mechanism 40 alone is configured with the entirety of the first differential mechanism 38 and the second differential mechanism 40. By the above, in the first power transmission part 20, the power of the engine 12, which is input to the first carrier C1, can be divided into the second sun gear S2 and the second carrier C2. That is, in the first power transmission part 20, the reaction force of the engine torque Te that is input to the first carrier C1 is taken in the first rotating machine MG1, whereby the engine direct-transmission torque is transmitted to the second carrier C2 and the generated electric power of the first rotating machine MG1 by the power of the engine 12 divided into the first rotating machine MG1 is transmitted to the second rotating machine MG2 through a predetermined electric path. The hybrid controller 92 causes the engine 12 to operate (activate), and also causes the MG1 torque Tg, which is the reaction force torque to the engine torque Te, to be output by the power generation of the first rotating machine MG1 and causes the MG2 torque Tm to be output from the second rotating machine MG2 by the generated electric power of the first rotating machine MG1. FIG. 11 shows a case at the time of a forward movement in which the second rotating machine MG2 outputs positive torque in a positive rotation.

Figure 12:
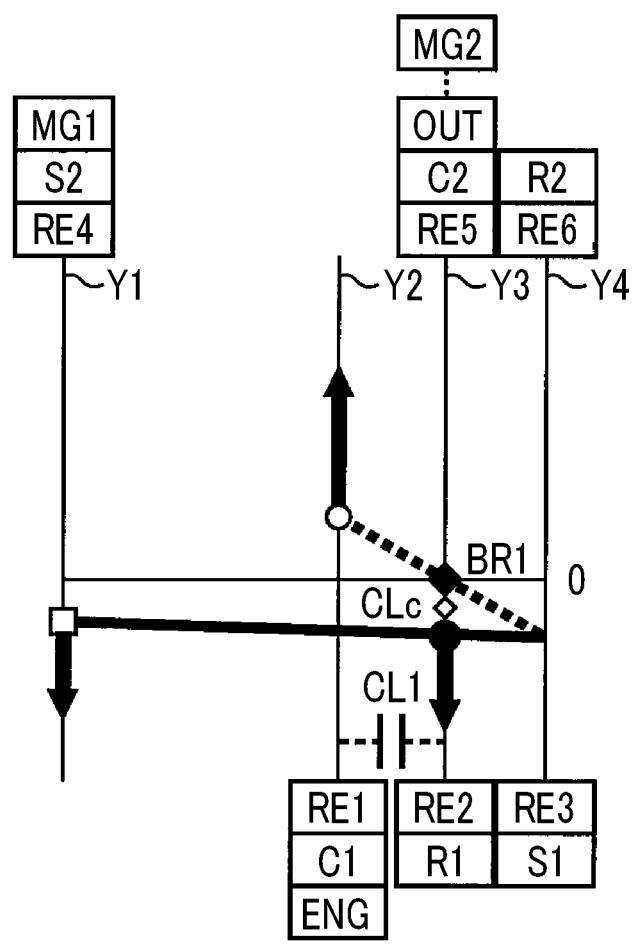
FIG. 12 is a collinear diagram in backward traveling in the U/DHV mode of the HV traveling mode and shows a case of engine reverse rotation input.

FIG. 12 is a collinear diagram in the backward traveling in the U/DHV mode of the HV traveling mode and shows the case of engine reverse rotation input in which the rotation and torque of the engine 12 are reversed to negative values and input to a configuration that achieves the function of an electric type continuously variable transmission. The backward traveling in the engine reverse rotation input of the U/DHV mode (hereinafter referred to as U/DHV mode reverse rotation input (backward movement)) is realized in a state where the brake BR1 is engaged and a state where the clutch CL1 and the clutch CLc are disengaged, as shown in "ENGINE REVERSE ROTATION INPUT" of "BACKWARD MOVEMENT" of "U/D INPUT SPLIT" of FIG. 3. In the U/DHV mode reverse rotation input (backward movement), the clutch CL1 is disengaged, the brake BR1 is engaged, and the first differential mechanism 38 enters a reverse rotation speed change state of the engine 12. Therefore, the power of the engine 12, which is input to the first carrier C1, is transmitted to the second ring gear R2 connected to the first sun gear S1 with a negative rotation and negative torque. In addition, in the U/DHV mode reverse rotation input (backward movement), the clutch CLc is disengaged and an electric type continuously variable transmission is configured with the second differential mechanism 40 alone. Accordingly, in the first power transmission part 20, the power of the engine 12, which is reversed and input to the second ring gear R2, can be divided into the second sun gear S2 and the second carrier C2. The hybrid controller 92 causes the engine 12 to operate (activate), and also causes the MG1 torque Tg, which is the reaction force torque to the engine torque Te, to be output by the powering of the first rotating machine MG1 and causes the MG2 torque Tm to be output from the second rotating machine MG2 by the electric power that is supplied from the battery unit 52. FIG. 12 shows a case where the second rotating machine MG2 outputs negative torque in a negative rotation, so that backward traveling is performed. In the U/DHV mode reverse rotation input (backward movement), the power of the engine 12 is transmitted to the second ring gear R2 with a negative rotation and negative torque, and therefore, it is possible to output drive torque for backward traveling together with the MG2 torque Tm. The second rotating machine MG2 may output positive torque in a negative rotation in order to generate electric power that is used for the powering of the first rotating machine MG1, and also in this case, since the engine direct-transmission torque that becomes the negative torque has an absolute value larger than the MG2 torque Tm, the backward traveling is possible.

Figure 13:
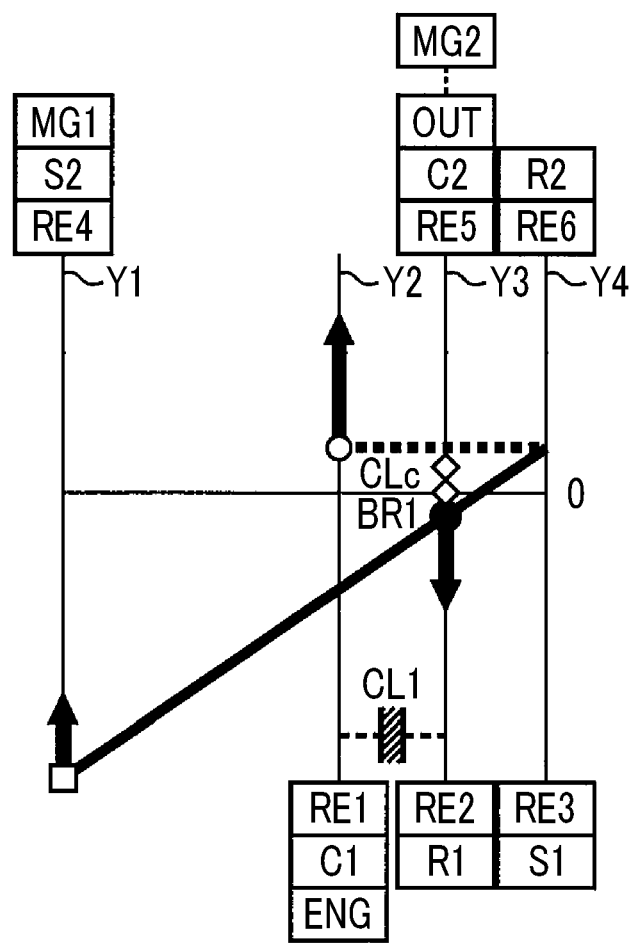
FIG. 13 is a collinear diagram in backward traveling in the U/DHV mode of the HV traveling mode and shows a case of engine forward rotation input.

FIG. 13 is a collinear diagram in the backward traveling in the U/DHV mode of the HV traveling mode and shows the case of engine forward rotation input. The backward traveling in the engine forward rotation input of the U/DHV mode (hereinafter referred to as U/DHV mode forward rotation input (backward movement)) is realized in a state where the clutch CL1 is engaged and a state where the brake BR1 and the clutch CLc are disengaged, as shown in "ENGINE FORWARD ROTATION INPUT" of "BACKWARD MOVEMENT" of "U/D INPUT SPLIT" of FIG. 3. In the U/DHV mode forward rotation input (backward movement), the clutch CL1 is engaged, the brake BR1 is disengaged, and the first differential mechanism 38 enters the direct connection state. Therefore, the power of the engine 12, which is input to the first carrier C1, is directly transmitted to the second ring gear R2 connected to the first sun gear S1. In addition, in the U/DHV mode forward rotation input (backward movement), the clutch CLc is disengaged and an electric type continuously variable transmission is configured with the second differential mechanism 40 alone. By the above, in the first power transmission part 20, the power of the engine 12, which is input to the second ring gear R2, can be divided into the second sun gear S2 and the second carrier C2. The hybrid controller 92 causes the engine 12 to operate (activate), and also causes the MG1 torque Tg, which is the reaction force torque to the engine torque Te, to be output by the power generation of the first rotating machine MG1 and causes the MG2 torque Tm to be output from the second rotating machine MG2 by the generated electric power of the first rotating machine MG1. FIG. 13 shows a case where the second rotating machine MG2 outputs negative torque in a negative rotation, so that backward traveling is performed. The engine direct-transmission torque is positive torque. However, the output torque (negative value) of the second rotating machine MG2 that is driven with the generated electric power of the first rotating machine MG1 (or driven by adding the electric power that is supplied from the battery unit 52 to the generated electric power of the first rotating machine MG1) has an absolute value larger than the engine direct-transmission torque, and therefore, the backward traveling is possible.

Figure 14:
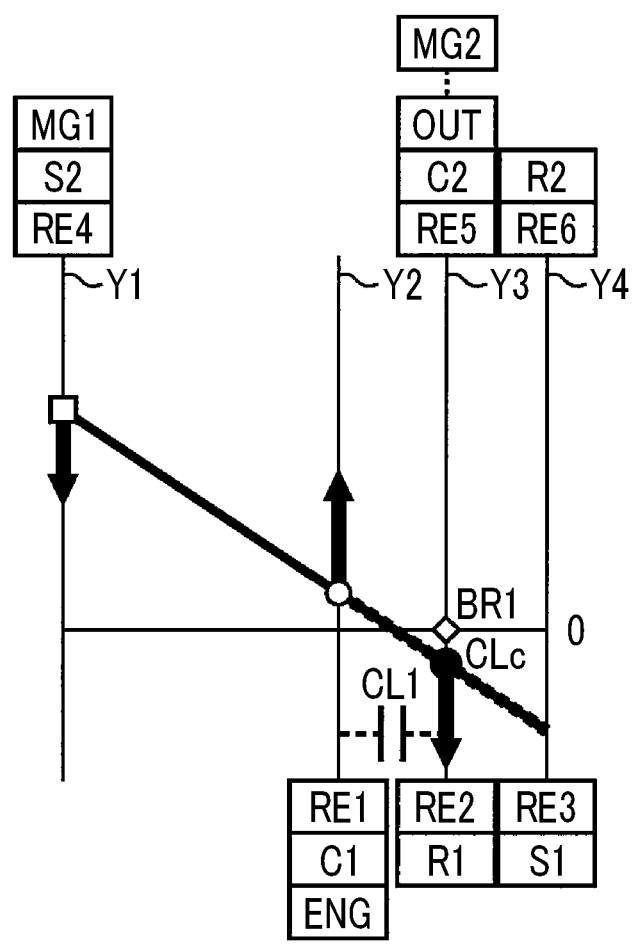
FIG. 14 is a collinear diagram in backward traveling in the O/DHV mode of the HV traveling mode and shows a case of engine forward rotation input.

FIG. 14 is a collinear diagram in the backward traveling in the O/DHV mode of the HV traveling mode and shows the case of engine forward rotation input. The backward traveling in the engine forward rotation input of the O/DHV mode (hereinafter referred to as O/DHV mode forward rotation input (backward movement)) is realized in a state where the clutch CL1 and the brake BR1 are disengaged and a state where the clutch CLc is engaged, as shown in "ENGINE FORWARD ROTATION INPUT" of "BACKWARD MOVEMENT" of "O/D INPUT SPLIT" of FIG. 3. In the O/DHV mode forward rotation input (backward movement), the clutch CLc is engaged and a single differential mechanism is configured with the first differential mechanism 38 and the second differential mechanism 40. In addition, in the O/DHV mode forward rotation input (backward movement), the clutch CL1 and the brake BR1 are disengaged, and an electric type continuously variable transmission that operates with a power split ratio different from the power split ratio in the second differential mechanism 40 alone is configured with the entirety of the first differential mechanism 38 and the second differential mechanism 40. By the above, in the first power transmission part 20, the power of the engine 12, which is input to the first carrier C1, can be divided into the second sun gear S2 and the second carrier C2. The hybrid controller 92 causes the engine 12 to operate (activate), and also causes the MG1 torque Tg, which is the reaction force torque to the engine torque Te, to be output by the power generation of the first rotating machine MG1 and causes the MG2 torque Tm to be output from the second rotating machine MG2 by the generated electric power of the first rotating machine MG1. FIG. 14 shows a case where the second rotating machine MG2 outputs negative torque in a negative rotation, so that backward traveling is performed. The engine direct-transmission torque is positive torque. However, backward traveling is possible, similar to the case of the U/DHV mode forward rotation input (backward movement).

As described using FIG. 10 to FIG. 14, in the U/DHV mode and the O/DHV mode, with respect to a configuration achieving a function as an electric type continuously variable transmission, the rotation elements to which the power of the engine 12 is input are different from each other and the power split ratios when the first power transmission part 20 is caused to function as an electric type continuously variable transmission are different from each other. That is, in the O/DHV mode and the U/DHV mode, each output torque or the ratio of each rotation speed of the rotating machines MG1, MG2 with respect to the engine 12 can be changed. The operating state of the clutch CLc is switched in order to change each output torque or the ratio of each rotation speed of the rotating machines MG1, MG2 with respect to the engine 12 during the engine traveling.

A case where in a so-called mechanical point state that is a state where the MG1 rotation speed Ng becomes zero and the power of the engine 12 is completely transmitted to the second carrier C2 without passing through an electric path (an electric power transmission path that is an electric path related to giving and receiving of the electric power of the first rotating machine MG1 or the second rotating machine MG2), an under drive state where the rotation of the engine 12 is decelerated and output from the second carrier C2 is created is the U/DHV mode, and a case where an overdrive state where the rotation of the engine 12 is increased and output from the second carrier C2 is created is the O/DHV mode. The engine direct-transmission torque in the U/DHV mode is increased with respect to the engine torque Te. On the other hand, the engine direct-transmission torque in the O/DHV mode is reduced with respect to the engine torque Te.

Each of the U/DHV mode (forward movement), the U/DHV mode forward rotation input (backward movement), and the engine brake combined mode in the U/D input split is the first traveling mode in which when the differential state of the second differential mechanism 40 is controlled by controlling the operating state of the first rotating machine MG1 (that is, when an electric type continuously variable transmission is configured) in a state where the clutch CL1 that is one engagement device of the clutch CL1 and the clutch CLc is engaged (that is, a state where the clutch CL1 is engaged and the clutch CLc is disengaged), the torque increased more than the engine torque Te is transmitted to the second carrier C2. On the other hand, each of the O/DHV mode (forward movement), the O/DHV mode forward rotation input (backward movement), and the engine brake combined mode in the O/D input split is the second traveling mode in which when the differential state of the second differential mechanism 40 is controlled by controlling the operating state of the first rotating machine MG1 in a state where the clutch CLc that is the other engagement device of the clutch CL1 and the clutch CLc is controlled so as to be engaged (that is, a state where the clutch CL1 is disengaged and the clutch CLc is engaged), the torque reduced more than the engine torque Te is transmitted to the second carrier C2.

Figure 15:
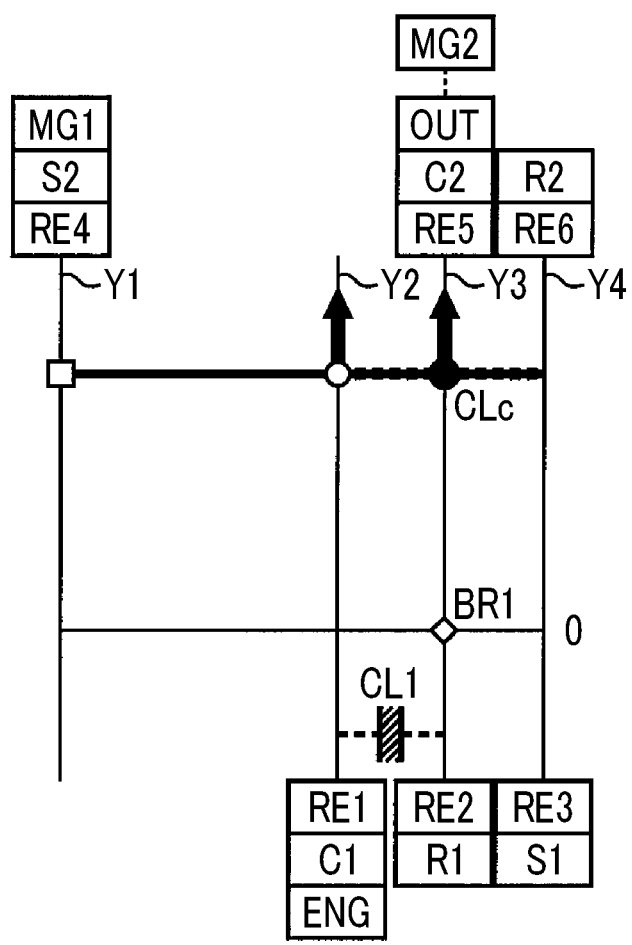
FIG. 15 is a collinear diagram in a fixed stage mode of the HV traveling mode and shows a case of direct connection.

FIG. 15 is a collinear diagram in the fixed stage mode of the HV traveling mode and shows the case of direct connection in which the respective rotation elements of the first differential mechanism 38 and the second differential mechanism 40 are integrally rotated. The direct connection of the fixed stage mode (hereinafter referred to as a direct connection fixed stage mode) is realized in a state where the clutch CL1 and the clutch CLc are engaged and a state where the brake BR1 is disengaged, as shown in "DIRECT CONNECTION" of "FORWARD MOVEMENT" of "FIXED STAGE" of FIG. 3. In the direct connection fixed stage mode, the clutch CL1 is engaged, the brake BR1 is disengaged, and the first differential mechanism 38 enters the direct connection state. In addition, in the direct connection fixed stage mode, the clutch CLc is engaged, and the respective rotation elements of the first differential mechanism 38 and the second differential mechanism 40 are integrally rotated. Accordingly, in the first power transmission part 20, the power (torque) of the engine 12 can be directly transmitted to the second carrier C2. The hybrid controller 92 causes the engine torque Te for traveling to be output from the engine 12. In the direct connection fixed stage mode, it is also possible to directly transmit the power of the first rotating machine MG1 to the second carrier C2 by driving the first rotating machine MG1 with the electric power from the battery unit 52. In the direct connection fixed stage mode, it is also possible to transmit the power of the second rotating machine MG2 to the drive wheels 16 by driving the second rotating machine MG2 with the electric power from the battery unit 52. Therefore, the hybrid controller 92 may cause the torque for traveling to be output from at least one rotating machine of the first rotating machine MG1 and the second rotating machine MG2, in addition to causing the engine torque Te to be output. That is, in the direct connection fixed stage mode, the vehicle 10 may be driven solely by the engine 12 or torque assist may be performed with at least one of the first rotating machine MG1 or the second rotating machine MG2. The direct connection fixed stage mode is the third traveling mode in which the clutch CL1 and the clutch CLc are engaged, whereby the respective rotation elements of the first differential mechanism 38 and the second differential mechanism 40 are integrally rotated, and the torque of the engine 12 is directly transmitted to the second carrier C2.

Figure 16:
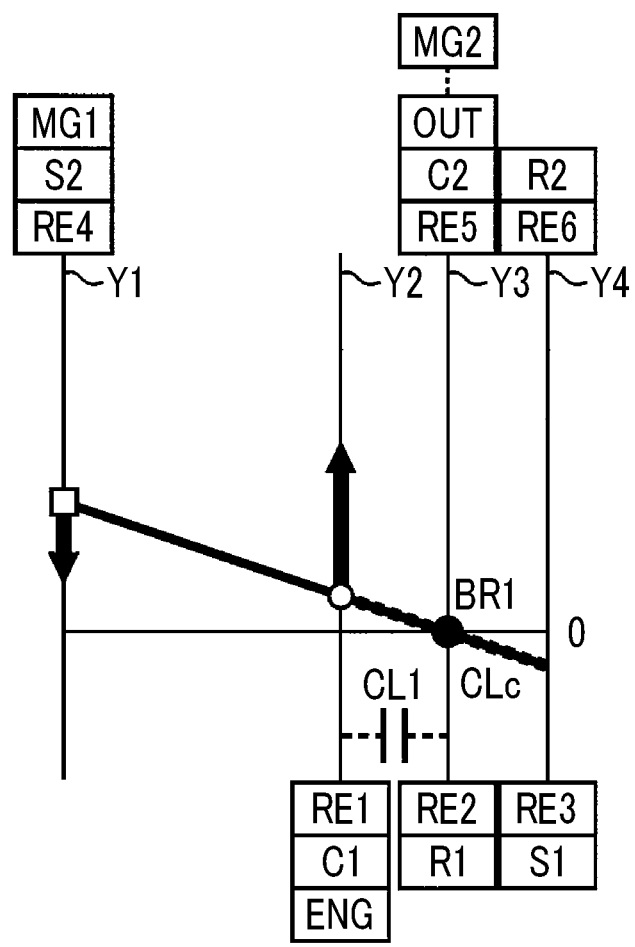
FIG. 16 is a collinear diagram in the fixed stage mode of the HV traveling mode and shows a case of output shaft fixing.

FIG. 16 is a collinear diagram in the fixed stage mode of the HV traveling mode and shows the case of output shaft fixing in which the second carrier C2 is fixed so as to be unable to rotate. The output shaft fixing of the fixed stage mode (hereinafter referred to as an output shaft fixed stage mode) is realized in a state where the brake BR1 and the clutch CLc are engaged and a state where the clutch CL1 is disengaged, as shown in "OUTPUT SHAFT FIXING" of "FORWARD MOVEMENT" of "FIXED STAGE" of FIG. 3. In the output shaft fixed stage mode, the clutch CLc is engaged, and a single differential mechanism is configured with the first differential mechanism 38 and the second differential mechanism 40. In addition, in the output shaft fixed stage mode, the brake BR1 is engaged, the clutch CL1 is disengaged, and the second carrier C2 is fixed so as to be unable to rotate. By the above, in the first power transmission part 20, the reaction force of the power of the engine 12, which is input to the first carrier C1, can be taken in the first rotating machine MG1. Therefore, in the output shaft fixed stage mode, it is possible to charge the battery unit 52 with the generated electric power of the first rotating machine MG1 by the power of the engine 12. The hybrid controller 92 causes the engine 12 to operate (activate), and also causes the reaction force to the power of the engine 12 to be taken by the power generation of the first rotating machine MG1 and charges the battery unit 52 with the generated electric power of the first rotating machine MG1 through the electric power control unit 50. The output shaft fixed stage mode is a mode of exclusively charging the battery unit 52 at the time of the stop of the vehicle 10, because the second carrier C2 is fixed so as to be unable to rotate. As described using FIG. 15 and FIG. 16, the clutch CLc is engaged in the direct connection fixed stage mode or the output shaft fixed stage mode of the HV traveling mode.

In an area where a speed reduction ratio I (=Ne/No) of the first power transmission part 20 is relatively large, the absolute value of each of the output ratio (Pg/Pe) of the MG1 power Pg to the engine power Pe and the output ratio (Pm/Pe) of the MG2 power Pm to the engine power Pe becomes smaller in the U/DHV mode than in the O/DHV mode. Therefore, in the area where the speed reduction ratio I is relatively large, by establishing the U/DHV mode, it is possible to suppress an increase in the MG1 power Pg and an increase in the MG2 power Pm. On the other hand, in an area where the speed reduction ratio I is relatively small, which is smaller than "1", the output ratio (Pm/Pe) becomes a negative value (that is, the output ratio (Pg/Pe) becomes a positive value), and the absolute value of each of the output ratio (Pg/Pe) and the output ratio (Pm/Pe) becomes larger in the U/DHV mode than in the O/DHV mode. A state where the output ratio (Pm/Pe) becomes a negative value (that is, a state where the output ratio (Pg/Pe) becomes a positive value) is a power circulation state where the second rotating machine MG2 generates electric power and the generated electric power is supplied to the first rotating machine MG1. It is desirable that this power circulation state is avoided or suppressed as much as possible. For this reason, in the area where the speed reduction ratio I is relatively small, by establishing the O/DHV mode, it is possible to reduce power circulation power. By switching between the U/DHV mode and the O/DHV mode according to the speed reduction ratio I, it is possible to transmit the engine power with the rotating machines MG1, MG2 having a lower output (lower power).

That is, by selectively using the U/DHV mode and the O/DHV mode such that the U/DHV mode is established at the time of a high load of the engine 12 using a relatively large speed reduction ratio I and the O/DHV mode is established at the time of a low load of the engine 12 using a relatively small speed reduction ratio I, or a high vehicle speed, an increase in each torque or each rotation speed of the rotating machines MG1, MG2 is prevented or suppressed, and at the time of a high vehicle speed, the power circulation power is reduced. By the above, a reduction in energy conversion loss in the electric path is reduced and fuel economy is improved, downsizing of the rotating machines MG1, MG2 is achieved.

Figure 17:
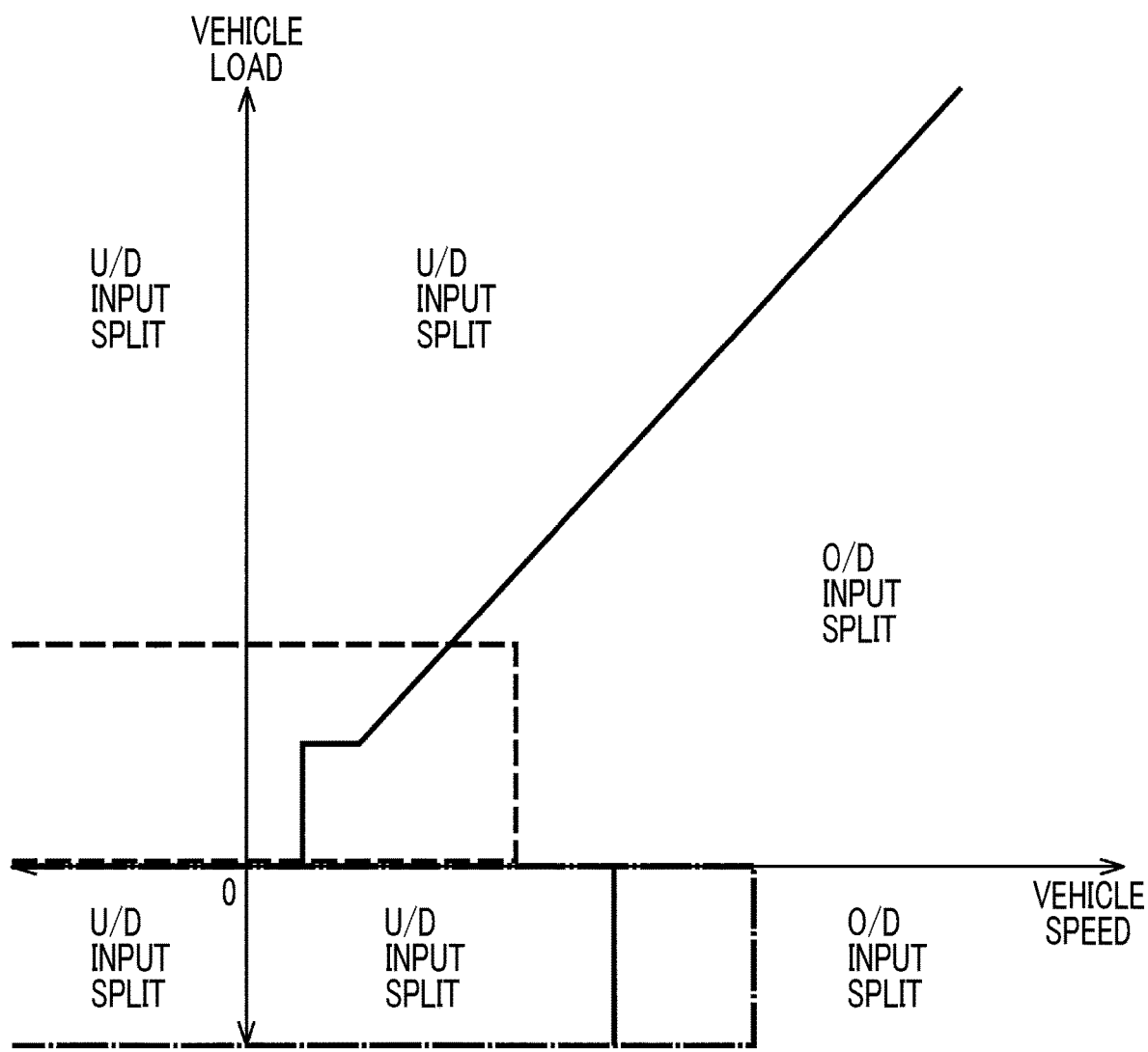
FIG. 17 is a graph showing an example of a traveling mode switching map that is used for switching control between engine traveling and motor traveling, and shows a case of traveling in a state of retaining battery capacity.
Figure 18:
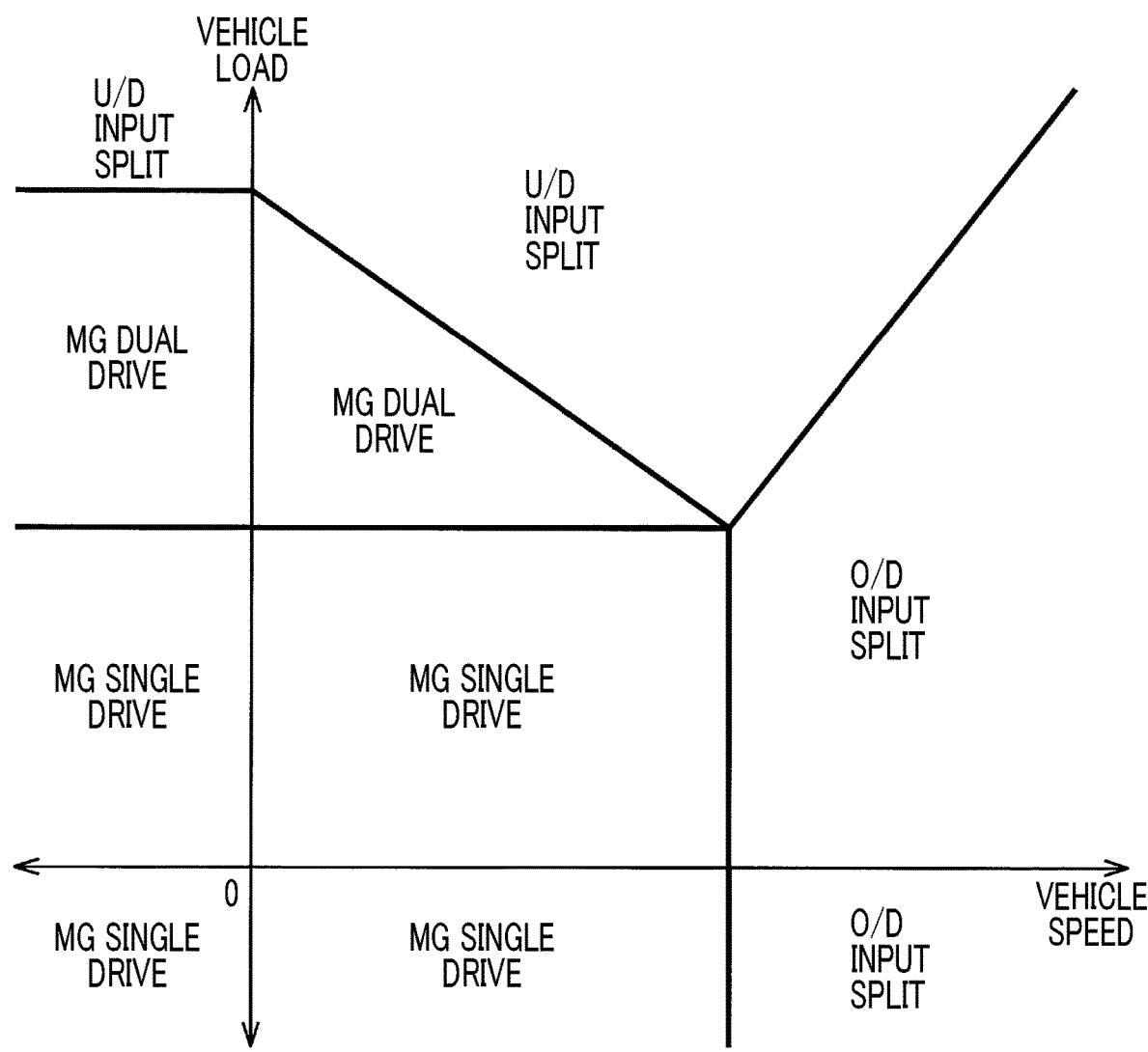
FIG. 18 is a graph showing an example of the traveling mode switching map that is used for the switching control between the engine traveling and the motor traveling, and shows a case of traveling while consuming battery capacity.

Each of FIG. 17 and FIG. 18 is a graph showing an example of a traveling mode switching map that is used for the switching control between the engine traveling and the motor traveling. Each of these traveling mode switching maps is a relationship obtained experimentally or in design and stored in advance (that is, determined in advance), which has a boundary line between an engine traveling area and a motor traveling area with the vehicle speed V and a traveling load of the vehicle 10 (hereinafter referred to as a vehicle load) (for example, the request drive torque) as variables.

FIG. 17 shows the state transition of the power transmission device 14 (that is, the switching of the traveling mode of the vehicle 10) in charge sustain (CS) traveling in which traveling is performed in a state of retaining the battery capacity SOC. FIG. 17 is used in a case where the vehicle 10 is, for example, a hybrid vehicle or the like, in which the battery capacity SOC is originally set to be relatively small. FIG. 17 is used in a case where a mode of retaining the battery capacity SOC is established, for example, in the vehicle 10 such as a plug-in hybrid vehicle or a range extended vehicle, in which the battery capacity SOC is originally set to be relatively large. On the other hand, FIG. 18 shows the state transition of the power transmission device 14 (that is, the switching of the traveling mode of the vehicle 10) in charge depleting (CD) traveling in which traveling is performed while consuming the battery capacity SOC. FIG. 18 is used in a case where a mode of consuming the battery capacity SOC is established, for example, in the vehicle 10 such as a plug-in hybrid vehicle or a range extended vehicle, in which the battery capacity SOC is originally set to be relatively large. In a case where the vehicle 10 is, for example, a hybrid vehicle or the like, in which the battery capacity SOC is originally set to be relatively small, it is preferable that FIG. 18 is not used.

In FIG. 17, an area of each traveling mode according to the traveling states such as the vehicle speed V and the vehicle load is set such that the U/DHV mode is established at the time of a high load and the O/DHV mode is easily established at the time of a low load or a high vehicle speed. In a case where electric power take-out of the battery unit 52 is possible (alternatively, in a case where warming-up of each device due to warming-up of the engine 12 or the operation of the engine 12 is completed), in an area where the operation efficiency of the engine 12 deteriorates, the powering of the second rotating machine MG2 is performed in the motor traveling. For this reason, in an area having a low vehicle speed and a low load, as shown by a broken line, an area of the single drive EV mode is set. In a case where the vehicle load is negative, in the U/DHV mode or the O/DHV mode, deceleration traveling is performed in which the engine brake using the negative torque of the engine 12 is operated. In a case where the electric power reception of the battery unit 52 is possible, the regenerative control by the second rotating machine MG2 is performed in the motor traveling. For this reason, in an area where the vehicle load is negative, as shown by a dot-and-dash line, an area of the single drive EV mode is set. In the traveling mode switching map in the CS traveling set as described above, for example, at the time of starting, the U/DHV mode is established in the traveling of both the forward and backward movements. By the above, the engine power Pe can be more effectively used, and therefore, starting acceleration performance is improved. In the forward traveling, the speed reduction ratio I of the first power transmission part 20 becomes near "1", along with an increase in the vehicle speed V. In the state described above, a transition to the direct connection fixed stage mode may be performed. In low vehicle speed traveling, the engine rotation speed Ne becomes extremely low, and therefore, a direct transition from the U/DHV mode to the O/DHV mode is performed. In the direct connection fixed stage mode, there is no power transmission through the rotating machines MG1, MG2, and therefore, a heat loss according to the conversion between mechanical energy and electric energy is eliminated. Therefore, the direct connection fixed stage mode is advantageous for improving fuel economy or avoiding heat generation. For this reason, at the time of a high load such as towing or a high vehicle speed, the transition to the direct connection fixed stage mode may be positively performed. When a switch for selecting the motor traveling is operated by a driver and the motor traveling is selected, the single drive EV mode is established in the area as shown by the broken line.

In FIG. 18, an area of each traveling mode according to the traveling states such as the vehicle speed V and the vehicle load is set such that the single drive EV mode is established in an area where the vehicle load is low and the dual drive EV mode is established in an area where the vehicle load is high. In the dual drive EV mode, the power sharing ratio between the first rotating machine MG1 and the second rotating machine MG2 can be determined based on the operation efficiency of the first rotating machine MG1 and the second rotating machine MG2 (for example, for the purpose of improvement in electricity cost, a decrease in the temperature of each of the rotating machines MG1, MG2, a decrease in the temperature of the electric power control unit 50, and the like). Depending on the maximum output of the battery unit 52 or the maximum output of the rotating machines MG1, MG2, or in a case where an increase in the rotation speed of any one rotation element of the power transmission device 14 due to an increase in the vehicle speed V during the motor traveling is alleviated by operating the engine 12, as shown in FIG. 18, the area of the HV traveling mode may be set in the high load area or the high vehicle speed area and a transition to a state where the engine 12 is used as a power source for traveling may be performed. In an area where the vehicle load is negative, the area of the single drive EV mode is set such that the regenerative control by the second rotating machine MG2 is performed in the motor traveling. In the traveling mode switching map in the CD traveling set as described above, for example, when the vehicle speed V increases, the rotation speeds of the respective elements such as the rotating machines MG1, MG2 and the differential mechanisms 38, 40 increase, and therefore, a transition to the HV traveling mode set in the traveling mode switching map in the CS traveling is performed, and thus the rotation speed of each element is controlled to be within the limit. In the single drive EV mode, the first rotating machine MG1 and the engine 12 are disconnected (that is, the power transmission between the first rotating machine MG1 and the engine 12 is interrupted), and therefore, the area on the high vehicle speed side of the single drive EV mode may be extended to the higher vehicle speed side than in the dual drive EV mode. The regenerative control in the area where the vehicle load is negative may be performed in the dual drive EV mode instead of the single drive EV mode. An upper limit may be provided for the drive torque or the vehicle speed V such that the engine 12 is not started, thereby not consuming fuel.

The hybrid controller 92 applies the vehicle speed V and the vehicle load (for example, the request drive torque) to the traveling mode switching map as shown in FIG. 17 or FIG. 18, thereby determining a traveling mode to be established. In a case where the determined traveling mode is the current traveling mode, the hybrid controller 92 establishes the current traveling mode as it is, and on the other hand, in a case where the determined traveling mode is different from the current traveling mode, the determined traveling mode is established instead of the current traveling mode.

In a case where the single drive EV mode is established, the hybrid controller 92 enables the motor traveling using solely the second rotating machine MG2 as a power source for traveling. In a case where the dual drive EV mode is established, the hybrid controller 92 enables the motor traveling using both the first rotating machine MG1 and the second rotating machine MG2 as a power source for traveling.

In a case where the U/DHV mode or the O/DHV mode is established, the hybrid controller 92 enables the engine traveling in which traveling is performed by transmitting the engine direct-transmission torque to the second carrier C2 by handling the reaction force to the power of the engine 12 by the power generation of the first rotating machine MG1, and also transmitting torque to the drive wheels 16 by driving the second rotating machine MG2 by the generated electric power of the first rotating machine MG1. In the U/DHV mode or the O/DHV mode, the hybrid controller 92 operates the engine 12 at an engine operation point (that is, an engine operation point that is represented by the engine rotation speed Ne and the engine torque Te) taking into account a known optimum fuel consumption line of the engine 12. In the U/DHV mode or the O/DHV mode, it is also possible to drive the second rotating machine MG2 by adding the electric power from the battery unit 52 to the generated electric power of the first rotating machine MG1.

In a case where the direct connection fixed stage mode is established, the hybrid controller 92 enables the engine traveling in which traveling is performed by directly outputting the power of the engine 12 to the second carrier C2. In the direct connection fixed stage mode, the hybrid controller 92 also allows traveling to be performed by driving the first rotating machine MG1 with the electric power from the battery unit 52 in addition to the power of the engine 12 and directly transmitting the power of the first rotating machine MG1 to the second carrier C2, or driving the second rotating machine MG2 with the electric power from the battery unit 52 and transmitting the power of the second rotating machine MG2 to the drive wheels 16.

In a case where at the time of the stop of the vehicle, the battery capacity SOC is equal to or less than a predetermined capacity determined in advance, in which a determination that charging of the battery unit 52 is needed is made, the hybrid controller 92 establishes the output shaft fixed stage mode. In a case where the output shaft fixed stage mode is established, the hybrid controller 92 causes the reaction force to the power of the engine 12 to be handled by the power generation of the first rotating machine MG1 and charges the battery unit 52 with the generated electric power of the first rotating machine MG1 through the electric power control unit 50.

In either the U/DHV mode or the O/DHV mode, the first power transmission part 20 functions as an electric type continuously variable transmission. A state where the speed reduction ratio I of the first power transmission part 20 becomes "1" is a state equivalent to the state of the direct connection fixed stage mode (refer to FIG. 15) in which both the clutch CL1 and the clutch CLc are engaged. Therefore, the hybrid controller 92 executes the switching between the U/DHV mode in which the clutch CL1 is engaged and the O/DHV mode in which the clutch CLc is engaged, by switching the operating state of each of the clutch CL1 and the clutch CLc (through the state equivalent to the direct connection fixed stage mode) in a synchronous state where the speed reduction ratio I is "1". The hybrid controller 92 may execute the switching between the U/DHV mode in which the clutch CL1 is engaged and the O/DHV mode in which the clutch CLc is engaged, by so-called clutch-to-clutch shift control that performs a change of engagement of the clutch CL1 and the clutch CLc.

In the single drive EV mode, the engine 12 enters a corotation state due to engagement of the clutch CL1 or the clutch CLc. Therefore, in a case where the engine 12 is started during the motor traveling in the single drive EV mode, the hybrid controller 92 engages the clutch CL1 or the clutch CLc and increases the engine rotation speed Ne to perform ignition. In this case, the hybrid controller 92 may increase the engine rotation speed Ne with the first rotating machine MG1, as needed.

In a case where the engine 12 is started during the motor traveling in the single drive EV mode, the hybrid controller 92 synchronously controls the rotation speed of each element of the differential mechanisms 38, 40 with the first rotating machine MG1 such that the same state as a state where the clutch CL1 or the clutch CLc is engaged is created in a state where the engine rotation speed Ne is zero (rpm), and thereafter, engages the clutch CL1 in the same state as a state where the clutch CL1 is engaged, or engages the clutch CLc in the same state as a state where the clutch CLc is engaged, and increases the engine rotation speed Ne with the first rotating machine MG1 to perform ignition. That is, in a case where the engine 12 is started during the motor traveling in the single drive EV mode, the hybrid controller 92 performs synchronous control with the first rotating machine MG1 such that the rotation speed of each element of the differential mechanisms 38, 40 is in the state equivalent to the standby mode, although the engagement device (the clutch CL1 or the clutch CLc) for establishing the standby mode is still disengaged, and thereafter, temporarily establishes the standby mode by engaging the engagement device for establishing the standby mode, and increases the engine rotation speed Ne with the first rotating machine MG1 from the state of the standby mode to perform ignition. As described above, in a case where the engine 12 is started during the motor traveling in the single drive EV mode, a transition to the engine traveling via the standby mode may be performed. In this case, the standby mode (the U/D input split or the O/D input split) to be passed through may be established in accordance with the traveling mode (the U/DHV mode or the O/DHV mode) at the time of the engine traveling.

At the time of the start of the engine 12, negative torque (also referred to as engine pull-in torque) of the engine 12 according to an increase in the rotation of the engine 12 during operation stop is transmitted to the second carrier C2 connected to the drive wheels 16 as a reaction force for increasing the engine rotation speed Ne, and therefore, a drop in drive torque occurs. In a case where the engine 12 is started during the motor traveling in the single drive EV mode, in order to suppress a shock at the time of the start of the engine, the hybrid controller 92 causes the second rotating machine MG2 to additionally output torque (also referred to as reaction force canceling torque) for compensating for the drop in driving torque.

In the dual drive EV mode that is a state where the clutch CL1 and the brake BR1 are engaged, the brake BR1 is disengaged, whereby the engine 12 enters the corotation state. Therefore, in a case where the engine 12 is started during the motor traveling in the dual drive EV mode, the hybrid controller 92 disengages the brake BR1, and thereafter, engages the clutch CLc and increases the engine rotation speed Ne to perform ignition. In this case, the hybrid controller 92 may increase the engine rotation speed Ne with the first rotating machine MG1, as needed. In a case where the engine 12 is started during the motor traveling in the dual drive EV mode, the hybrid controller 92 disengages the brake BR1 and increases the engine rotation speed Ne with the first rotating machine MG1 to perform ignition. In the dual drive EV mode, a state equivalent to the single drive EV mode is created by disengaging the clutch CL1 and the brake BR1, and therefore, by disengaging the clutch CL1 and the brake BR1, it is also possible to perform engine starting in the single drive EV mode described above. In a case where the engine 12 is started during the motor traveling in the dual drive EV mode, the hybrid controller 92 causes the second rotating machine MG2 to additionally output the reaction force canceling torque.

When a determination to stop the engine 12 during the traveling in the engine traveling mode is made, the hybrid controller 92 executes the engine stop control (corresponding to engine stop control in the present disclosure) that stops fuel supply to the engine 12 and causes the first rotating machine MG1 to lower the engine rotation speed Ne to zero to stop the engine 12. The hybrid controller 92 functionally includes an engine stop position controller 95 that executes, at the time of the engine stop control, engine stop position control that stops the crank angle of the engine 12 at a rotation angle suitable for an engine restart, by controlling the first rotating machine MG1 after a stop of the engine 12 or immediately before a stop of the engine 12 such that smooth starting can be performed at the time of the next engine restart. The engine stop position controller 95 corresponds to an engine stop position controller in the present disclosure.

Incidentally, when the engine stop control by the first rotating machine MG1 is executed during the traveling in the U/DHV mode in an area where the vehicle speed V is a high vehicle speed, there is a case where the MG1 rotation speed Ng of the first rotating machine MG1 enters an overspeed state in a transition period in which the engine rotation speed Ne is lowered. In this case, the control of the first rotating machine MG1 becomes difficult, that is, the engine stop position control becomes difficult, whereby it becomes difficult to stop the crank angle of the engine 12 at a rotation angle suitable for an engine restart. As a result, the next engine restart is not appropriately performed, and there is also a possibility that a shock may occur at the time of an engine restart.

In contrast, when a determination to execute the engine stop control for stopping the engine 12 during the traveling in the U/DHV mode is made, in a case where the vehicle speed V is equal to or higher than a predetermined vehicle speed V1, the electronic control unit 90 performs switching from the U/DHV mode to the O/DHV mode and then lowers the engine rotation speed Ne to zero to stop the crank angle of the engine 12 (the crankshaft 12a) at a rotation angle suitable for an engine restart. As described above, the switching to the O/DHV mode is performed during the engine stop control, whereby overspeed of the MG1 rotation speed Ng during the engine stop control is suppressed. Therefore, the engine stop position control by the first rotating machine MG1 can be executed, and therefore, the crank angle of the engine 12 can be stopped at the rotation angle suitable for an engine restart. Hereinafter, the engine stop control by the electronic control unit 90 will be described in detail.

The electronic control unit 90 further functionally includes state determination means, that is, a state determination unit 96, vehicle speed determination means, that is, a vehicle speed determination unit 98, and rotation increase determination means, that is, a rotation increase determination unit 100, in order to prevent the overspeed of the first rotating machine MG1 at the time of the engine stop control and appropriately execute the engine stop position control.

The state determination unit 96 determines whether or not traveling is being performed in the U/DHV mode (the U/D input split mode) according to engine drive. The state determination unit 96 determines whether or not the U/DHV mode is performed, based on the engine control command signal Se or the hydraulic pressure control command signal Sp, for example.

The vehicle speed determination unit 98 determines whether or not the vehicle speed V is equal to or higher than the predetermined vehicle speed V1 set in advance, when a determination to stop the engine 12 is made during the traveling in the U/DHV mode. The predetermined vehicle speed V1 is a value that is obtained experimentally or in design in advance, and is set to a lower limit value of a speed range in which the MG1 rotation speed Ng of the first rotating machine MG1 exceeds an allowable value (an upper limit threshold value usable by the first rotating machine MG1) during the engine stop control, or a value in the vicinity of the lower limit value, for example, in a case where the engine rotation speed Ne is lowered to zero by the first rotating machine MG1 in the state of the U/DHV mode. The allowable value of the MG1 rotation speed Ng is a value that is determined in a rated manner in consideration of the controllability or durability of the first rotating machine MG1. The vehicle speed V may be calculated from the wheel speed Nr that is detected by a wheel speed sensor (not shown), in addition to being calculated from the output rotation speed No that is detected by the output rotation speed sensor 72 and the gear ratio, and may be calculated from the MG2 rotation speed Nm of the second rotating machine MG2, which is detected by the MG2 rotation speed sensor 76.

In a case where the vehicle speed V is less than the predetermined vehicle speed V1, even in a case where the engine speed Ne is lowered to zero by the first rotating machine MG1 in the state of the U/DHV mode, the MG1 rotation speed Ng of the first rotating machine MG1 does not exceed the allowable value. That is, even though the engine rotation speed Ne is lowered to zero in the state of the U/DHV mode, the engine stop position control by the first rotating machine MG1 becomes possible. In the case as described above, the hybrid controller 92 executes, in the state of the U/DHV mode, the engine stop control that lowers the engine rotation speed Ne to zero and the engine stop position control that stops the crank angle of the engine 12 at a rotation angle suitable for an engine restart.

On the other hand, in a case where the vehicle speed V is equal to or higher than the predetermined vehicle speed V1, when the engine rotation speed Ne is lowered to zero by the first rotating machine MG1 in the state of the U/DHV mode, the MG1 rotation speed Ng of the first rotating machine MG1 exceeds the allowable value (overspeed). That is, the engine stop position control by the first rotating machine MG1 becomes difficult. In contrast, in a case where the vehicle speed V is equal to or higher than the predetermined vehicle speed V1, the power transmission switching unit 94 performs switching from the U/DHV mode to the O/DHV mode, prior to the engine stop control by the first rotating machine MG1. The power transmission switching unit 94 corresponds to a controller in the present disclosure.

Here, when performing the switching from the U/DHV mode to the O/DHV mode, as described above, it is possible to perform the switching by means for performing switching via the direct connection fixed stage mode (hereinafter referred to as first means), and (clutch-to-clutch shift control) means for performing a change of engagement of the clutch CL1 and the clutch CLc (hereinafter referred to as second means). The rotation increase determination unit 100 determines in advance whether the engine rotation speed Ne increases in a case of passing through the direct connection fixed stage mode, when performing the switching from the U/DHV mode to the O/DHV mode.

Whether the engine rotation speed Ne increases in a transition period in which the first means is executed, specifically, a transition period in which the switching to the direct connection fixed stage mode is performed, is determined, for example, based on whether or not the engine rotation speed Ne is lower than the output rotation speed No of the output shaft 24. When the switching to the direct connection fixed stage mode is performed in a state where the engine rotation speed Ne is lower than the output rotation speed No, the engine rotation speed Ne comes close to the output rotation speed No, and therefore, the engine rotation speed Ne increases in the transition period. The rotation increase determination unit 100 determines that the engine rotation speed Ne increases in the transition period in which the switching to the direct connection fixed stage mode is performed, in a case where the engine rotation speed Ne is lower than the output rotation speed No.

When the rotation increase determination unit 100 determines that the engine rotation speed Ne does not increase in a case of passing through the direct connection fixed stage mode from the U/DHV mode, the power transmission switching unit 94 executes the first means for switching from the U/DHV mode to the O/DHV mode via the direct connection fixed stage mode. In a case where the engine rotation speed does not increase during the engine stop control, a shock occurring at the time of engagement and disengagement of the clutches CL1, CLc is suppressed by passing through the direct connection fixed stage mode at the time of the switching to the O/DHV mode. On the other hand, in a case where the rotation increase determination unit 100 determines that the engine rotation speed Ne increases in a case of passing through the direct connection fixed stage mode from the U/DHV mode, the power transmission switching unit 94 executes the second means. As described above, in a case where a determination that the engine rotation speed Ne temporarily increases during the engine stop control by passing through the direct connection fixed stage mode is made, the second means is executed, whereby a sense of discomfort due to a temporary increase in the engine rotation speed Ne is suppressed.

First, the engine stop control by the first means for switching from the U/DHV mode to the O/DHV mode via the direct connection fixed stage mode will be described. The power transmission switching unit 94 first controls the first rotating machine MG1 to synchronize the MG1 rotation speed Ng with the output rotation speed No, thereby controlling the MG1 rotation speed Ng to a rotation state at the time of the switching to the direct connection fixed stage mode, that is, a synchronous state in which the speed reduction ratio I becomes 1, as shown in FIG. 15 (a state where the respective rotation elements of the first differential mechanism 38 and the second differential mechanism 40 are integrally rotated). When the synchronous state is created, the power transmission switching unit 94 performs the switching to the direct connection fixed stage mode by engaging the clutch CLc. In this case, since control to the synchronous state is performed in advance, a shock occurring when the clutch CLc is engaged is suppressed. When the switching to the direct connection fixed stage mode is performed, the power transmission switching unit 94 disengages the clutch CL1 by lowering the CL1 hydraulic pressure Pcl1 of the clutch CL1. By the above, the switching from the direct connection fixed stage mode to the O/DHV mode is performed. When the switching to the O/DHV mode is performed, the hybrid controller 92 controls the first rotating machine MG1 to lower the engine rotation speed Ne to zero to stop the engine 12. In this case, the hybrid controller 92 also executes the engine stop position control after the stop of the engine or immediately before the stop of the engine, thereby stopping the crank angle of the engine 12 at a rotation angle suitable for an engine restart. When the engine 12 stops, the power transmission switching unit 94 lowers the CLc hydraulic pressure Pclc of the clutch CLc to disengage the clutch CLc, thereby performing the switching to the single drive EV mode. The hybrid controller 92 controls the MG1 rotation speed Ng of the first rotating machine MG1 to zero. As described above, the traveling mode is switched from the O/DHV mode to the single drive EV mode, whereby the engine 12 and the first rotating machine MG1 are not corotated and the drag losses of the engine 12 and the first rotating machine MG1 are also suppressed.

The engine stop control by the second means for switching from the U/DHV mode to the O/DHV mode without passing through the direct connection fixed stage mode will be described. The power transmission switching unit 94 first executes clutch-to-clutch shift control that performs a change of engagement of the clutch CL1 and the clutch CLc (disengaging the clutch CL1 and engaging the clutch CLc). In this case, the switching from the U/DHV mode to the O/DHV mode is performed without an increase in the engine rotation speed Ne, and thus a sense of discomfort due to an increase in the engine rotation speed Ne during the engine stop control is suppressed. When the switching to the O/DHV mode is performed, the hybrid controller 92 controls the first rotating machine MG1 to lower the engine rotation speed Ne to zero to stop the engine 12. In this case, the hybrid controller 92 also executes the engine stop position control, thereby stopping the crank angle of the engine 12 at a rotation angle suitable for an engine restart. When the engine 12 stops, the power transmission switching unit 94 performs the switching to the single drive EV mode by disengaging the clutch CLc by lowering the CLc hydraulic pressure Pclc of the clutch CLc. The hybrid controller 92 controls the MG1 rotation speed Ng of the first rotating machine MG1 to zero. As described above, the traveling mode is switched from the O/DHV mode to the single drive EV mode, whereby the engine 12 and the first rotating machine MG1 are not corotated and the drag losses of the engine 12 and the first rotating machine MG1 are also suppressed.

In a case where it is desired to quickly stop the engine 12 during the traveling in the U/DHV mode, the engine 12 may be stopped in accordance with a situation by disengaging the clutch CL1 and performing the switching to the single drive EV mode. As described above, when the switching to the single drive EV mode is performed, although the engine 12 is quickly stopped in accordance with a situation, the crank angle of the engine 12 stops at a rotation angle according to a situation. The engine stop position control by the first rotating machine MG1 can be executed by engaging the clutch CLc after the stop of the engine 12 and temporarily performing the switching to the O/DHV mode. When the engine stop position control by the first rotating machine MG1 is completed, the clutch CLc is disengaged, whereby the switching to the single drive EV mode is performed.

Figure 19:
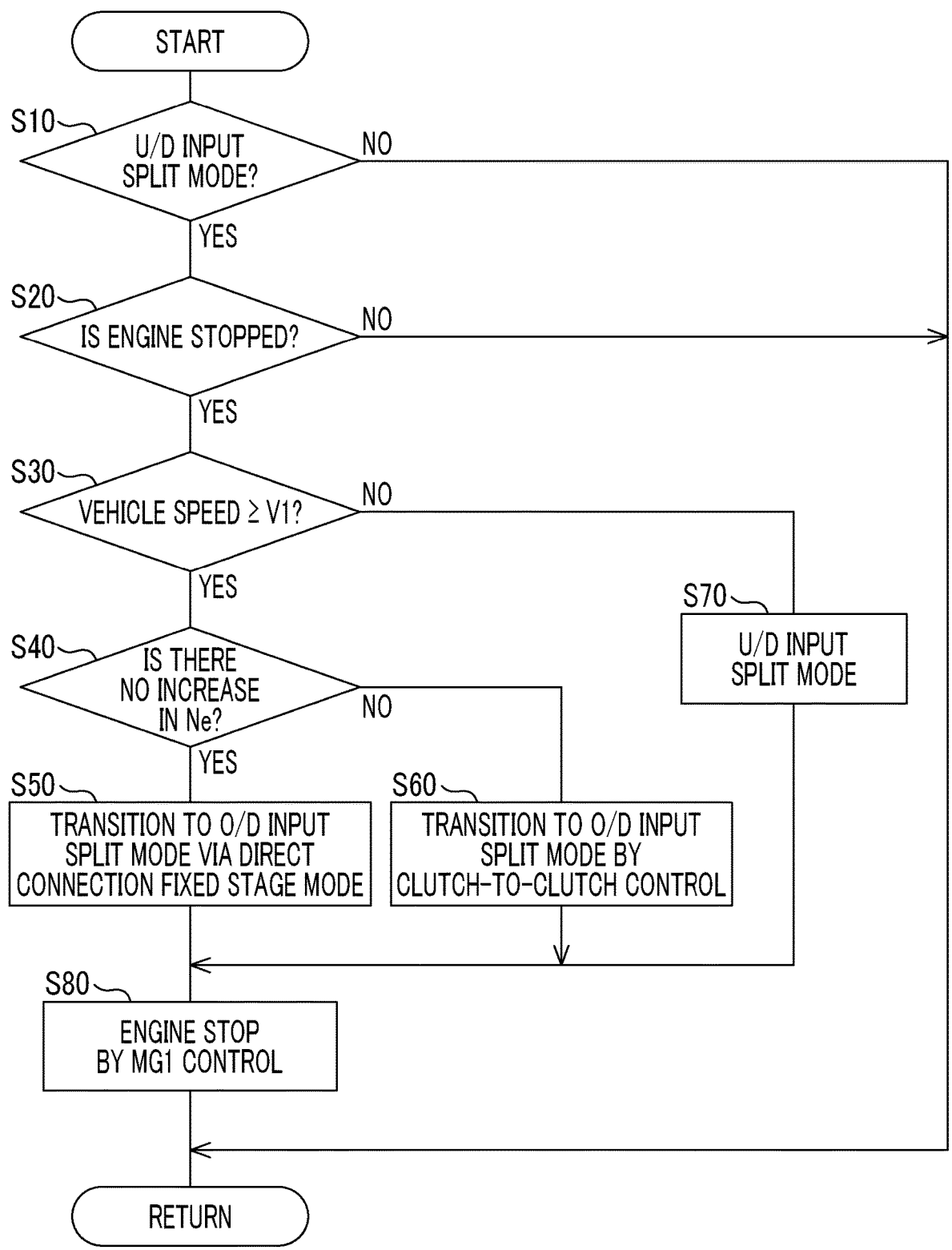
FIG. 19 is a flowchart for describing a main part of a control operation of an electronic control unit of FIG. 1, that is, a control operation capable of preventing overspeed of a rotation speed of a first rotating machine during engine stop control.

FIG. 19 is a flowchart for describing a main part of the control operation of the electronic control unit 90, that is, the control operation capable of preventing the overspeed of the MG1 rotation speed Ng of the first rotating machine MG1 during the engine stop control. This flowchart is repeatedly executed during traveling.

First, in step S10 (hereinafter, in an expression, step is omitted) corresponding to the control function of the state determination unit 96, a determination of whether or not the traveling in the U/DHV mode (the U/D input split mode) is being performed is made. In a case where the determination in S10 is negative, this routine is ended. In a case where the determination in S10 is affirmative, in S20 corresponding to the control function of the hybrid controller 92, a determination of whether or not a determination to stop the engine 12 has been made is made. In a case where the determination in S20 is negative, this routine is ended. In a case where the determination in S20 is affirmative, in S30 corresponding to the control function of the vehicle speed determination unit 98, a determination of whether or not the vehicle speed V is equal to or higher than the predetermined vehicle speed V1 is made. In a case where the determination in S30 is negative, the routine proceeds to S70 corresponding to the control function of the power transmission switching unit 94 and the U/DHV mode is maintained. In a case where the determination in S30 is affirmative, in S40 corresponding to the control function of the rotation increase determination unit 100, a determination of whether or not the engine rotation speed Ne increases in the case of the switching to the O/DHV mode via the direct connection fixed stage mode is made. In a case where the determination in S40 is negative, the routine proceeds to S60. On the other hand, in a case where the determination in S40 is affirmative, the routine proceeds to S50.

In S50 corresponding to the control function of the power transmission switching unit 94, the switching to the O/DHV mode (the O/D input split mode) via the direct connection fixed stage mode is performed when the engine stop control is executed. In this case, the rotation state is controlled to the state when switched to the direct connection fixed stage mode in advance by the first rotating machine MG1, whereby a shock occurring when the clutch CLc is engaged is suppressed. In S60 corresponding to the control function of the power transmission switching unit 94, the switching to the O/DHV mode is performed by a change of engagement of the clutch CL1 and the clutch CLc (the clutch-to-clutch shift control). In this case, although there is a possibility that a shock may occur during the change of engagement of the clutch, an increase in the engine rotation speed Ne is prevented, whereby a sense of discomfort due to an increase in the engine rotation speed Ne is prevented.

In S80 corresponding to the control function of the hybrid controller 92, the engine stop control that lowers the engine rotation speed Ne to zero by the first rotating machine MG1 is executed. The engine stop position control that stops the crank angle of the engine 12 at a rotation angle suitable for an engine restart is also executed together. When the engine 12 stops, the clutch CLc is disengaged, whereby the switching to the single drive EV mode is performed.

Figure 20:
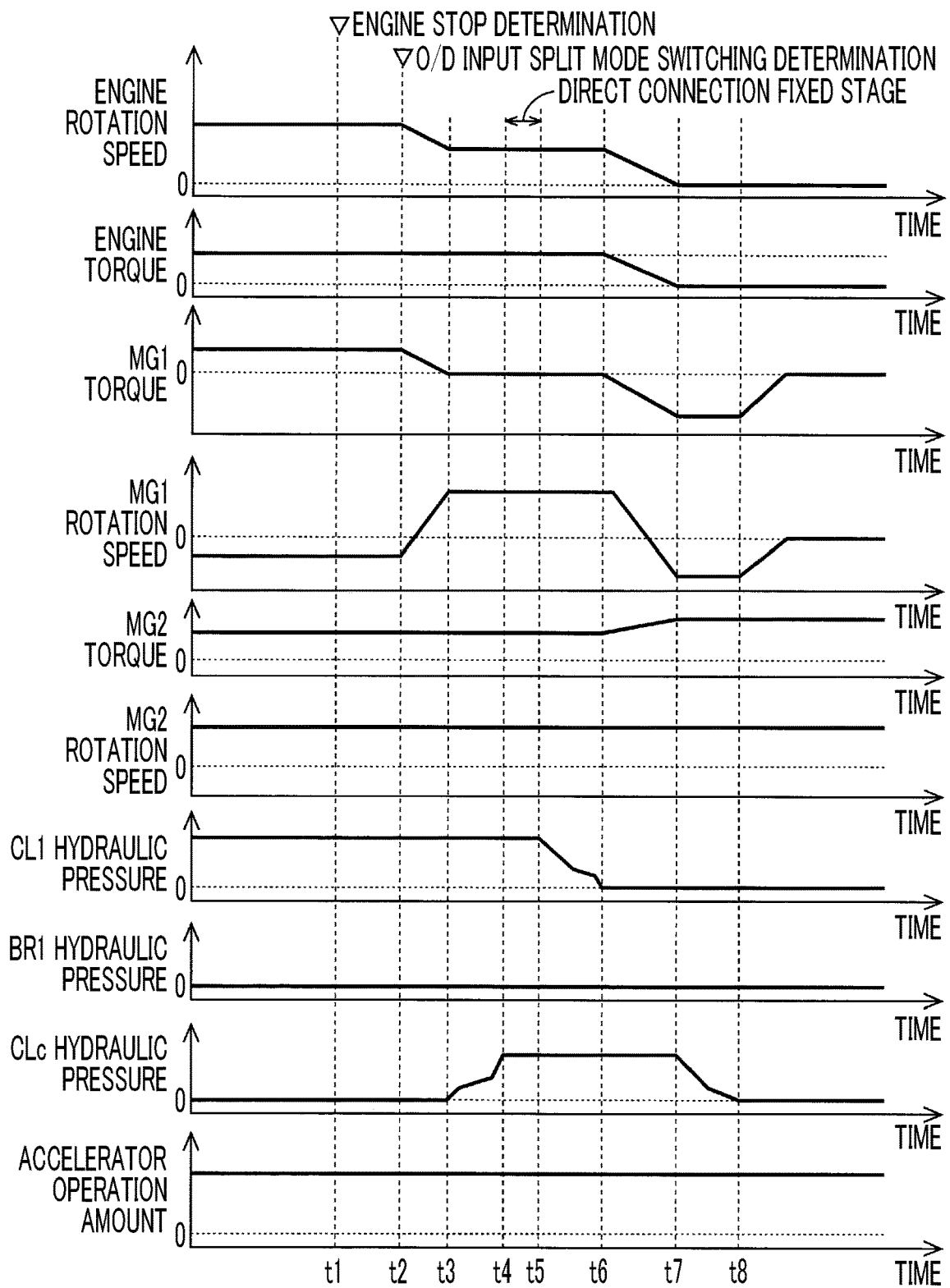
FIG. 20 is an aspect of a time chart showing an operating state when the engine stop control is executed based on the flowchart of FIG. 19.

FIG. 20 shows an aspect of a time chart showing an operating state when the engine stop control is executed based on the flowchart of FIG. 19. FIG. 20 corresponds to a case where the engine 12 is stopped (that is, a case where S50 is executed in FIG. 19) after the switching to the O/DHV mode via the direct connection fixed stage mode during the traveling in the U/DHV mode at the vehicle speed V equal to or higher than the predetermined vehicle speed V1. That is, it corresponds to a case where a determination that the engine rotation speed Ne does not increase even though the switching from the U/DHV mode to the O/DHV mode via the direct connection fixed stage mode is performed is made.

A determination to stop the engine 12 is made at time point t1, and at time point t2, a determination to perform the switching to the O/DHV mode via the direct connection fixed stage mode is made. At time point t2 to time point t3, the first rotating machine MG1 is controlled, whereby a rotation state is controlled to the rotation state when the switching to the direct connection fixed stage mode has been performed. When the rotation state when the switching to the direct connection fixed stage mode has been performed is created at time point t3, an increase in the CLc hydraulic pressure Pclc of the clutch CLc is started to engage the clutch CLc. When the clutch CLc is engaged at time point t4, the direct connection fixed stage mode in which the clutch CL1 and the clutch CLc are engaged at the same time is made. At time point t5, in order to perform the switching to the O/DHV mode, the CL1 hydraulic pressure Pcl1 of the clutch CL1 is lowered. When the clutch CL1 is disengaged at time point t6, the switching to the O/DHV mode is performed. At time point t6 to time point t7, the engine rotation speed Ne is lowered to zero by controlling the first rotating machine MG1. When the engine rotation speed Ne becomes zero at time point t7, the crank angle of the engine 12 is stopped at a rotation angle suitable for an engine restart by the first rotating machine MG1. The CLc hydraulic pressure Pclc of the clutch CLc is lowered (drained), whereby the switching to the single drive EV mode is performed. At time point t8, the clutch CLc is disengaged, whereby the switching to the single drive EV mode is performed and the MG1 rotation speed Ng of the first rotating machine MG1 is controlled to zero. The switching to the single drive EV mode is performed, whereby the drag loss due to the corotation of the first rotating machine MG1 and the engine 12 is also suppressed.

As described above, the overspeed of the first rotating machine MG1 is prevented by performing the switching to the O/DHV mode when the engine stop control is executed. Occurrence of a shock in the transition period of the switching to the O/DHV mode is also suppressed by passing through the direct connection fixed stage mode in the transition period of the switching to the O/DHV mode. The engine rotation speed Ne does not increase when passing through the direct connection fixed stage mode, and therefore, a sense of discomfort according to an increase in the engine rotation speed Ne is also suppressed.

Figure 21:
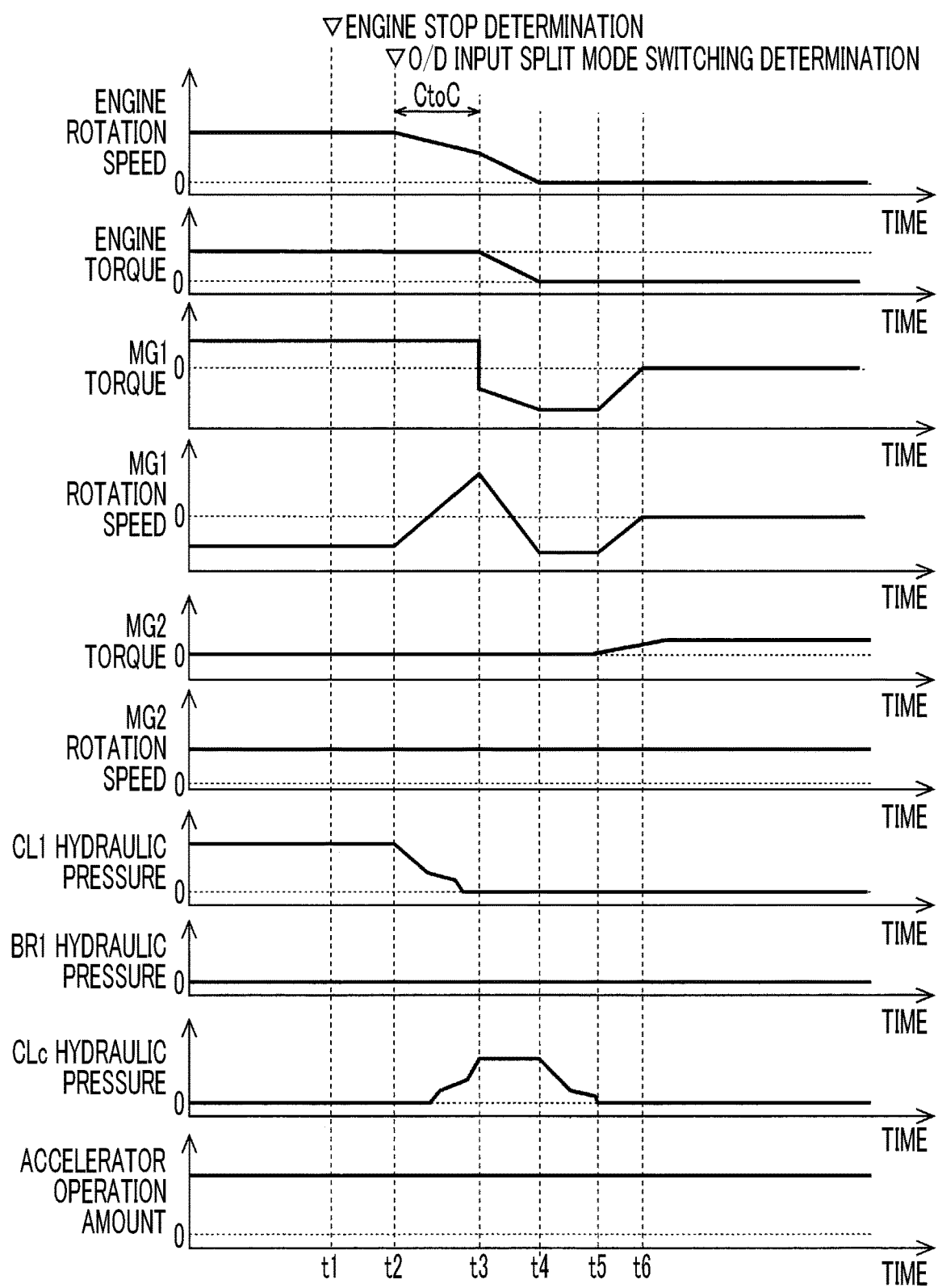
FIG. 21 is another aspect of a time chart showing the operating state when the engine control is executed based on the flowchart of FIG. 19.

FIG. 21 shows another aspect of a time chart showing the operating state when the engine control is executed based on the flowchart of FIG. 19. FIG. 21 corresponds to a case where the engine 12 is stopped (that is, a case where S60 is executed in FIG. 19) after the switching to the O/DHV mode is performed by the clutch-to-clutch shift control during the traveling in the U/DHV mode at the vehicle speed V equal to or higher than the predetermined vehicle speed V1. That is, it corresponds to a case where a determination that the engine rotation speed Ne increases when passing through the direct connection fixed stage mode at the time of the switching to the O/DHV mode is made.

A determination to stop the engine 12 is made at time point t1, and at time point t2, a determination to perform the switching to the O/DHV mode by the clutch-to-clutch shift control is made. At time point t2 to time point t3, the clutch-to-clutch shift control (C to C control) in which engagement of the clutch CL1 and the clutch CLc is changed is executed. At time point t3, when the clutch-to-clutch shift control is completed and the switching to the O/DHV mode is performed, the engine rotation speed Ne is lowered to zero by controlling the first rotating machine MG1 at time point t3 to time point t4. When the engine rotation speed Ne becomes zero at time point t4, the crank angle of the engine 12 is stopped at a rotation angle suitable for an engine restart by the first rotating machine MG1. At time point t4, since the switching to the single drive EV mode is performed, the lowering (drain) of the CLc hydraulic pressure Pclc of the clutch CLc is started. When the clutch CLc is disengaged at time point t5, the switching to the single drive EV mode is performed and the MG1 rotation speed Ng of the first rotating machine MG1 is controlled to zero.

As described above, in a case where a determination that the engine rotation speed Ne temporarily increases in a case of passing through the direct connection fixed stage mode at the time of the switching to the O/DHV mode is made, direct switching from the U/DHV mode to the O/DHV mode is performed by the clutch-to-clutch shift control, whereby an increase in the engine rotation speed Ne is suppressed, and thus a sense of discomfort due to an increase in the engine rotation speed Ne is suppressed.

Figure 22:
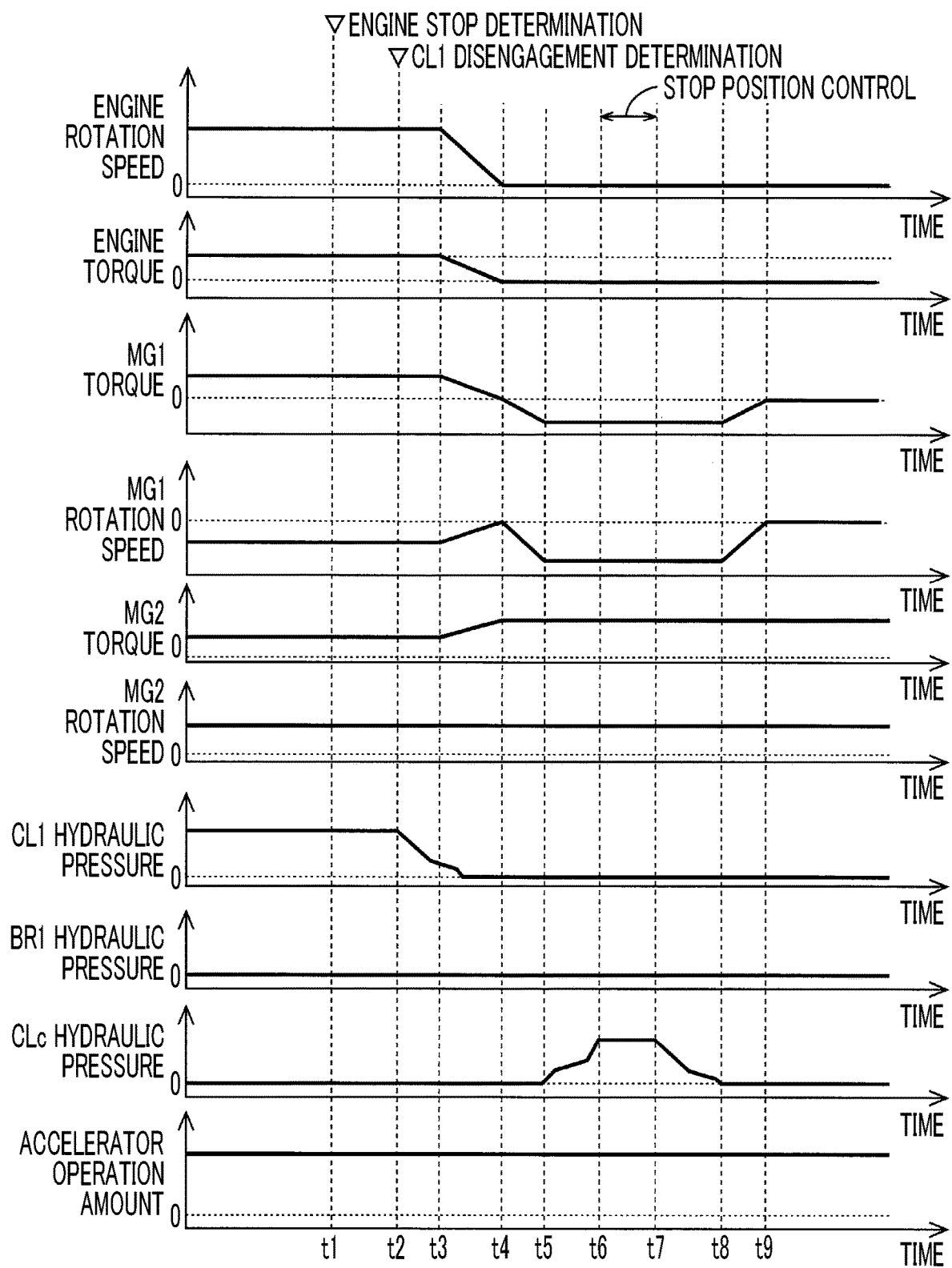
FIG. 22 is still another aspect of a time chart showing the operating state when the engine stop control is executed based on the flowchart of FIG. 19.

FIG. 22 shows still another aspect of a time chart showing the operating state when the engine stop control is executed. FIG. 22 is a case where the engine 12 is stopped during the traveling in the U/DHV mode at the vehicle speed V equal to or higher than the predetermined vehicle speed V1, and corresponds to in particular a control operation in a case where it is desired to quickly stop the engine 12.

When a determination to stop the engine 12 is made at time point t1 and a determination to disengage the clutch CL1 is made at time point t2, the CL1 hydraulic pressure Pcl1 of the clutch CL1 is lowered (drained) at time point t2 to time point t3. When the clutch CL1 is disengaged at time point t3, the engine rotation speed Ne of the engine 12 is lowered in accordance with a situation at time point t3 to time point t4. When the engine rotation speed Ne becomes zero at time point t4, at time point t4 to time point t5, the first rotating machine MG1 is controlled, whereby the MG1 rotation speed Ng is controlled to the synchronous rotation speed in a case of being switched to the O/DHV mode. When the MG1 rotation speed Ng reaches the synchronous rotation speed in a case of being switched to the O/DHV mode at time point t5, the CLc hydraulic pressure Pclc of the clutch CLc is increased, and thus the clutch CLc enters an engaged state at time point t6. In this case, the stop position control of the engine 12 by the first rotating machine MG1 can be executed. In relation to this, at time point t6 to time point t7, the engine stop position control by the first rotating machine MG1 is executed and the crank angle of the engine 12 is stopped at a rotation angle suitable for an engine restart. When the engine stop position control is completed at time point t7, the CLc hydraulic pressure Pclc of the clutch CLc is lowered and the clutch CLc is disengaged at time point t7 to time point t8. At time point t8 to time point t9, the MG1 rotation speed Ng of the first rotating machine MG1 is controlled to zero and the switching to the single drive EV mode is performed.

As described above, in a case where it is desired to quickly stop the engine 12 during the traveling in the U/DHV mode, the clutch CL1 is disengaged, thereby quickly stopping the engine 12 in accordance with a situation, and after the stop of the engine 12, the clutch CLc is temporarily engaged to execute the engine stop position control by the first rotating machine MG1, whereby the crank angle of the engine 12 is adjusted to a rotation angle suitable for an engine restart. After the engine stop position control, the switching to the single drive EV mode is performed. Control is performed as described above, whereby it is possible to quickly stop the engine 12.

As described above, according to this embodiment, when the vehicle speed V is equal to or higher than the predetermined vehicle speed V1 when the engine stop control is executed during the traveling in the U/DHV mode, there is a case where the rotation speed Ng of the first rotating machine MG1 enters an overspeed state. In the case as described above, the overspeed of the first rotating machine MG1 can be suppressed by performing the switching from the U/DHV mode to the O/DHV mode and executing the engine stop control. The overspeed of the first rotating machine MG1 is suppressed, whereby the engine stop position control by the first rotating machine MG1 can also be executed.

According to this embodiment, in a case where the engine rotation speed Ne does not increase in a case of passing through the direct connection fixed stage mode in the transition period in which the switching from the U/DHV mode to the O/DHV mode is performed, by passing through the direct connection fixed stage mode, it is possible to suppress a shock occurring during the switching from the U/DHV mode to the O/DHV mode while preventing an increase in the engine rotation speed Ne during the engine stop control. When the engine 12 stops, by performing the switching to the single drive EV mode in which traveling is performed by the second rotating machine MG2, it is possible to suppress the corotation of the engine 12 and the first rotating machine MG1 during traveling.

The embodiment of the present disclosure has been described in detail above based on the drawings. However, the present disclosure is also applied in other aspects.

For example, in the embodiment described above, when the traveling mode during traveling is the U/DHV mode and the vehicle speed V is equal to or higher than the predetermined vehicle speed V1, the MG1 rotation speed Ng becomes overspeed when the engine stop control is executed, and therefore, the overspeed of the MG1 rotation speed Ng is suppressed by performing the switching to the O/DHV mode. However, for example, depending on the gear ratio ρ1 of the first differential mechanism 38 and the gear ratio ρ2 of the second differential mechanism 40, the MG1 rotation speed Ng becomes overspeed in the case of the O/DHV mode, and thus a case where the overspeed of the MG1 rotation speed Ng during the engine stop control is suppressed by performing the switching to the U/DHV mode is also conceivable. In the case as described above, when a determination to stop the engine 12 during the traveling in the O/DHV mode is made, the switching from the O/DHV mode to the U/DHV mode may be performed. In this case, the O/DHV mode corresponds to the first traveling mode, and the U/DHV mode corresponds to the second traveling mode. In short, when the engine stop control is executed during traveling at the vehicle speed V equal to or higher than the predetermined vehicle speed V1, in a case where the current traveling mode is a traveling mode (the first traveling mode in the present disclosure) in which the MG1 rotation speed Ng becomes overspeed during the engine stop control, the overspeed of the MG1 rotation speed Ng during the engine stop control can be prevented by performing the switching to a traveling mode (the second traveling mode in the present disclosure) in which the MG1 rotation speed Ng does not become overspeed.

Figure 23:
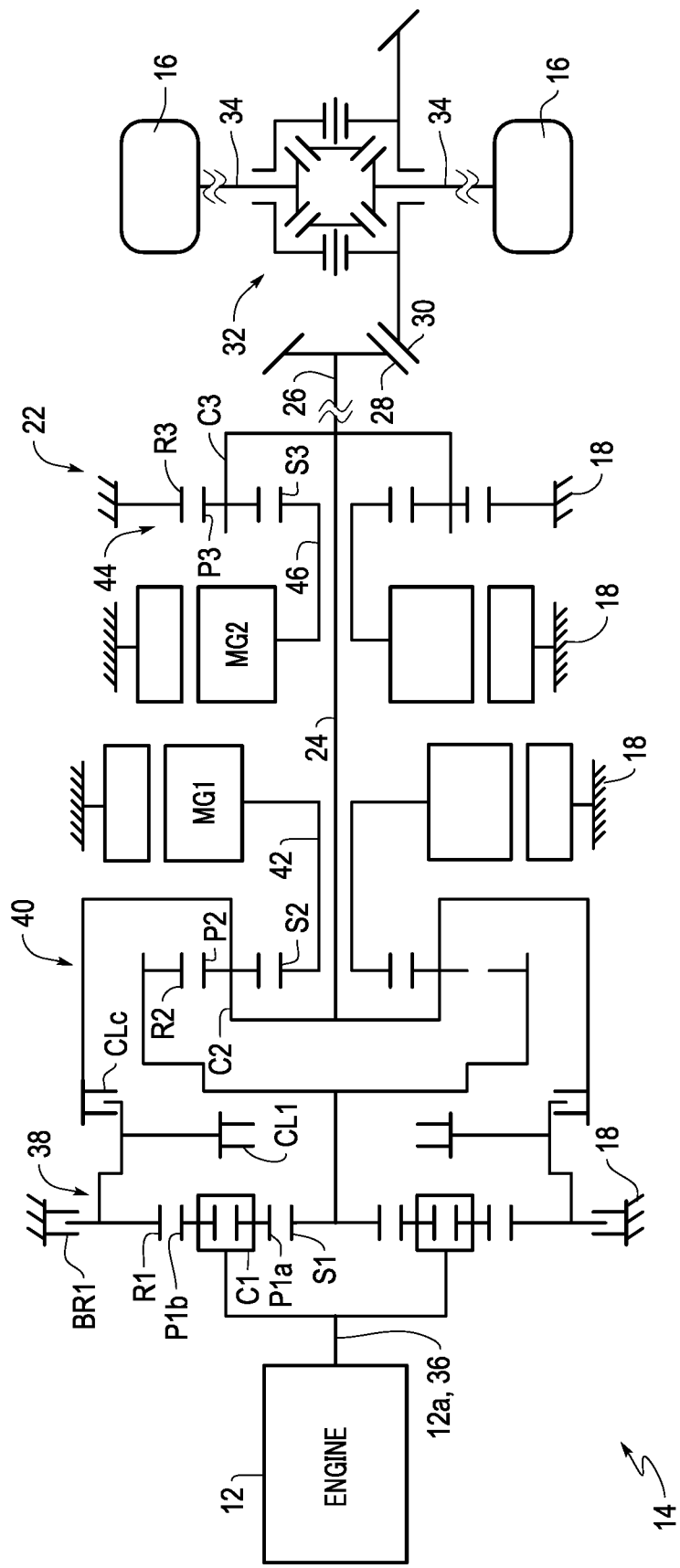
FIG. 23 is a diagram for describing another schematic configuration of each part relating to traveling of a vehicle to which the present disclosure is applied.
Figure 24:
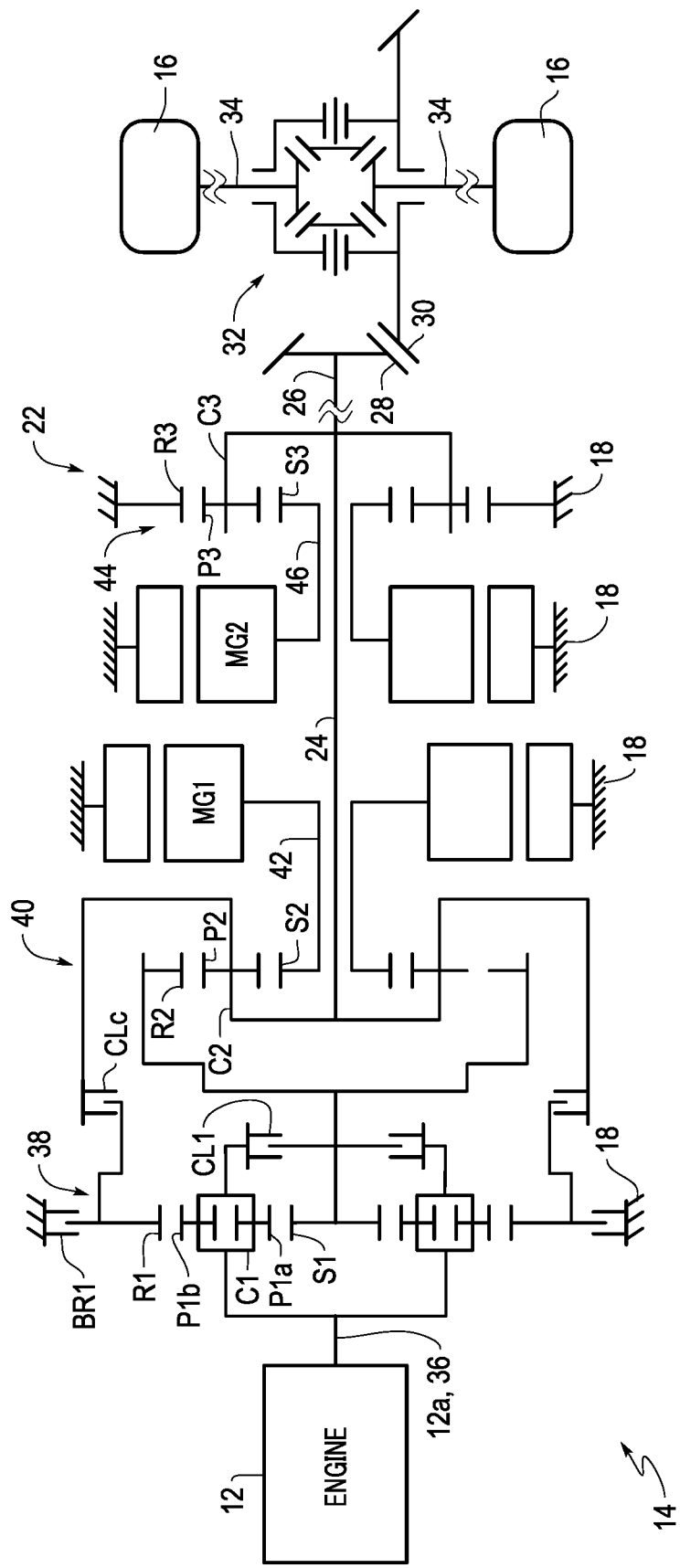
FIG. 24 is a diagram for describing another schematic configuration of each part relating to traveling of a vehicle to which the present disclosure is applied.

In the embodiment described above, as the first engagement device, the clutch CL1 that selectively connects the first rotation element RE1 and the second rotation element RE2 is exemplified. However, there is no limitation to the aspect described above. For example, the first engagement device may be the clutch CL1 that selectively connects the second rotation element RE2 and the third rotation element RE3 as illustrated by FIG. 23 or may be the clutch CL1 that selectively connects the first rotation element RE1 and the third rotation element RE3 as illustrated by FIG. 24. In short, the first engagement device may be any clutch that selectively connects any two rotation elements among the first rotation element RE1, the second rotation element RE2, and the third rotation element RE3.

In the embodiment described above, in collinear diagrams (refer to FIG. 4 to FIG. 16) in which the rotation speeds of the respective rotation elements RE1 to RE6 in each of the first differential mechanism 38 and the second differential mechanism 40 can be relatively shown, the vertical line Y1 represents the rotation speed of the fourth rotation element RE4 to which the first rotating machine MG1 is connected, the vertical line Y2 represents the rotation speed of the first rotation element RE1 to which the engine 12 is connected, the vertical line Y3 represents the rotation speed of the second rotation element RE2 that is selectively connected to the case 18 through the brake BR1, and the rotation speed of the fifth rotation element RE5 connected to the output shaft 24, and the vertical line Y4 represents the rotation speeds of the third rotation element RE3 and the sixth rotation element RE6 connected to each other. However, there is no limitation to the aspect described above. For example, as illustrated by the power transmission device 14 in FIGS. 25-27, the first differential mechanism and the second differential mechanism may be configured such that the rotation speeds of the rotation elements RE1 to RE6 are relatively shown in a collinear diagram in which the vertical line Y1 represents the rotation speed of the second rotation element RE2 that is selectively connected to the case 18 through the brake BR1, and the rotation speed of the fourth rotation element RE4 to which the first rotating machine MG1 is connected, the vertical line Y2 represents the rotation speed of the first rotation element RE1 to which the engine 12 is connected, the vertical line Y3 represents the rotation speed of the fifth rotation element RE5 connected to the output shaft 24, and the vertical line Y4 represents the rotation speeds of the third rotation element RE3 and the sixth rotation element RE6 connected to each other. In this case, the clutch CLc is the second engagement device that selectively connects the second rotation element RE2 and the fourth rotation element RE4. In this case, it is not possible to establish the U/DHV mode reverse rotation input (backward movement) that is realized in a state where the brake BR1 is engaged. In the U/DHV mode (forward movement), it is possible to establish the case of low input in which the engine rotation speed Ne is input at a constant speed, and which is realized in a state where the clutch CL1 is engaged, and the case of high input in which the engine rotation speed Ne is increased and input, and which is realized in a state where the brake BR1 is engaged.

Figure 25:
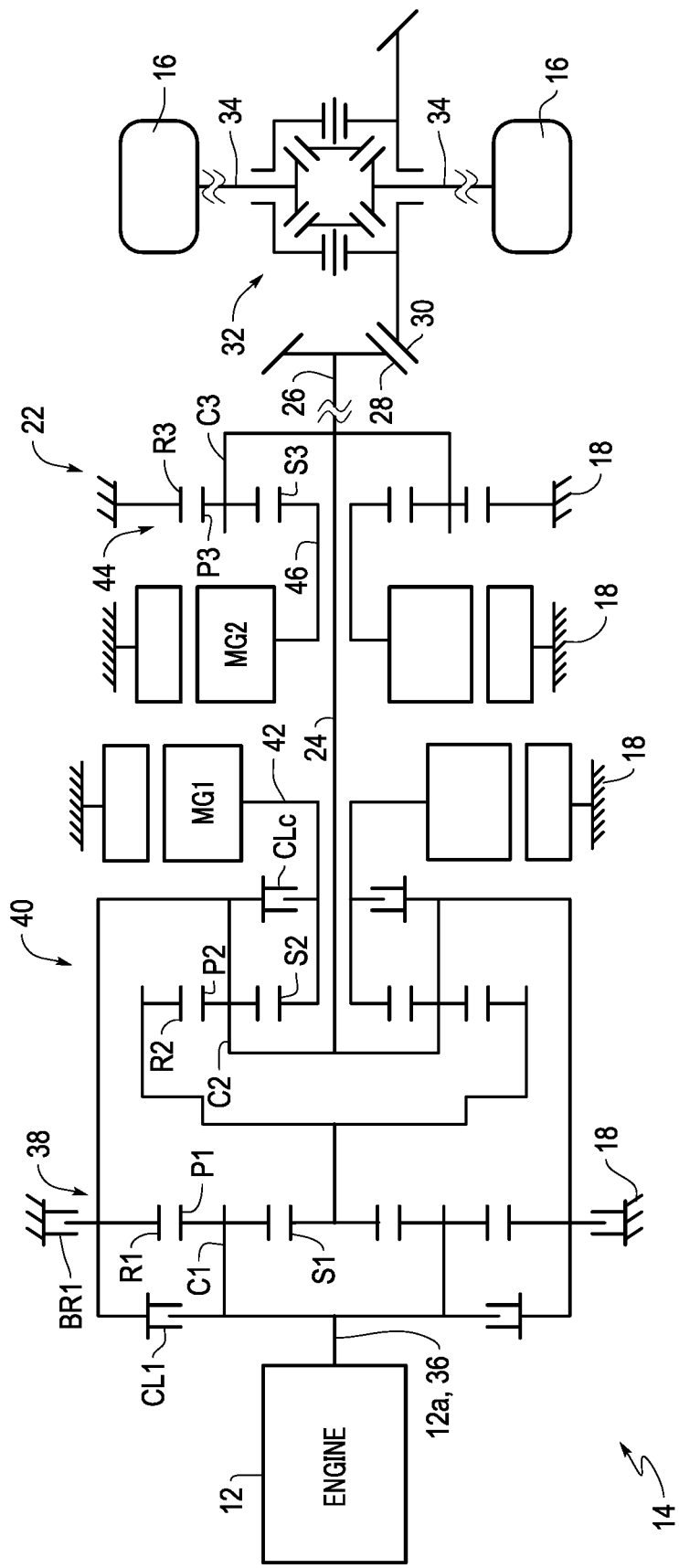
FIG. 25 is a diagram for describing another schematic configuration of each part relating to traveling of a vehicle to which the present disclosure is applied.
Figure 26:
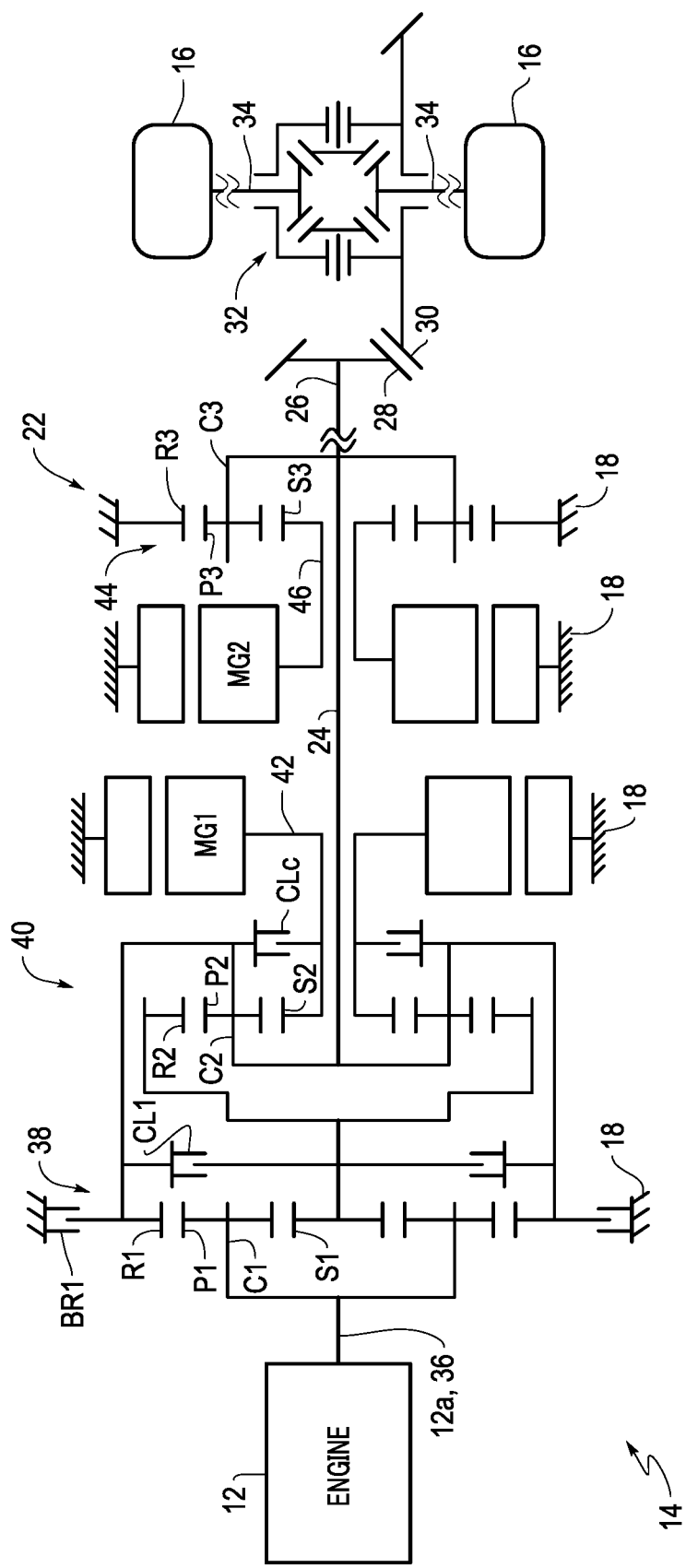
FIG. 26 is a diagram for describing another schematic configuration of each part relating to traveling of a vehicle to which the present disclosure is applied.
Figure 27:
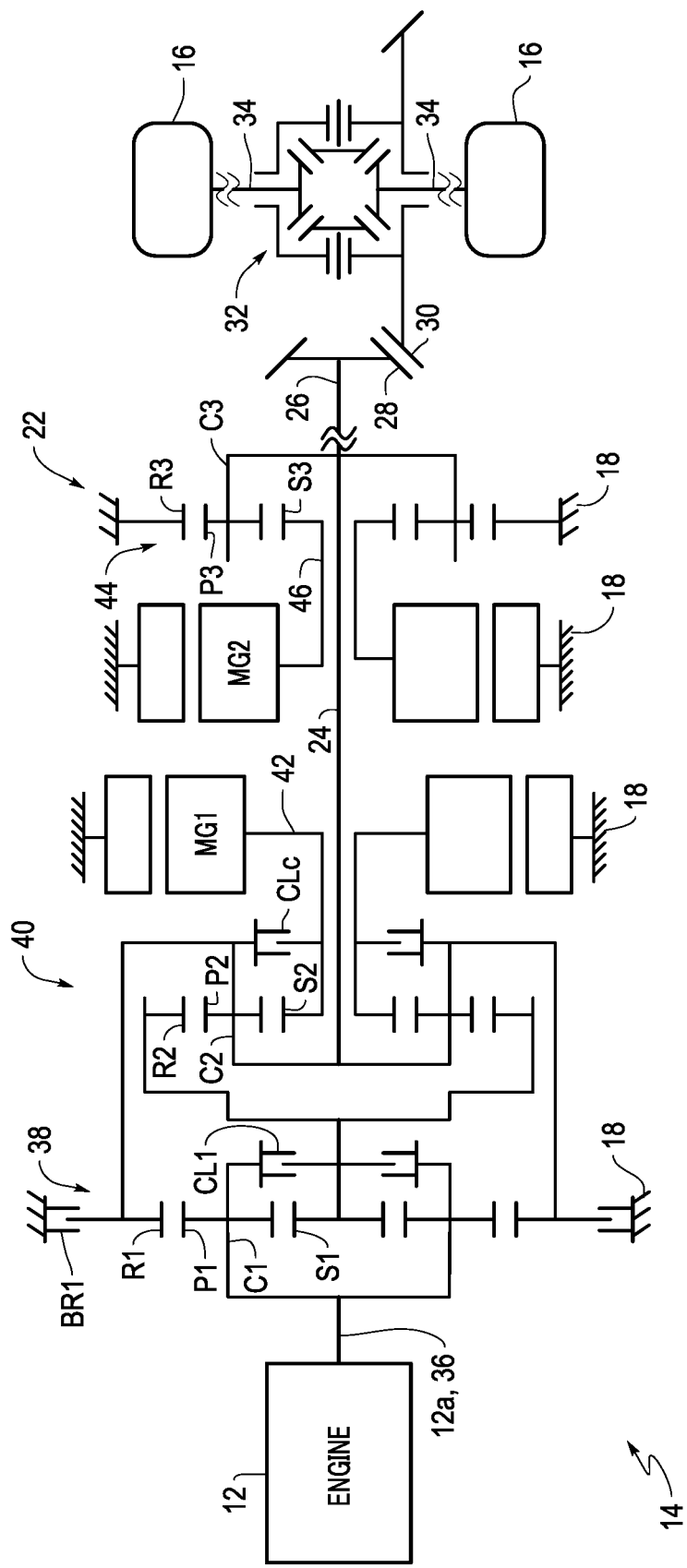
FIG. 27 is a diagram for describing another schematic configuration of each part relating to traveling of a vehicle to which the present disclosure is applied.

As is clear from the immediately preceding paragraphs, the first engagement device may be the clutch CL1 that selectively connects the first rotation element RE1 and the second rotation element RE2 and the second engagement device may be the clutch Clc that selectively connects the fifth rotation element RE5 and the second rotation element RE2 as illustrated by FIG. 1; the first engagement device may be the clutch CL1 that selectively connects the second rotation element RE2 and the third rotation element RE3 and the second engagement device may be the clutch Clc that selectively connects the fifth rotation element RE5 and the second rotation element RE2 as illustrated by FIG. 23; the first engagement device may be the clutch CL1 that selectively connects the first rotation element RE1 and the third rotation element RE3 and the second engagement device may be the clutch Clc that selectively connects the fifth rotation element RE5 and the second rotation element RE2 as illustrated by FIG. 24; the first engagement device may be the clutch CL1 that selectively connects the first rotation element RE1 and the second rotation element RE2 and the second engagement device may be the clutch Clc that selectively connects the fourth rotation element RE4 and the second rotation element RE2 as illustrated by FIG. 25; the first engagement device may be the clutch CL1 that selectively connects the second rotation element RE2 and the third rotation element RE3 and the second engagement device may be the clutch Clc that selectively connects the fourth rotation element RE4 and the second rotation element RE2 as illustrated by FIG. 26; and the first engagement device may be the clutch CL1 that selectively connects the first rotation element RE1 and the third rotation element RE3 and the second engagement device may be the clutch Clc that selectively connects the fourth rotation element RE4 and the second rotation element RE2 as illustrated by FIG. 27.

In the embodiment described above, in a state where the clutch CL1 is engaged, the first traveling mode (the U/DHV mode (forward movement), the U/DHV mode forward rotation input (backward movement), and the engine brake combined mode in the U/D input split) are established, and in a state where the clutch CLc is engaged, the second traveling mode (the O/DHV mode (forward movement), the O/DHV mode forward rotation input (backward movement), and the engine brake combined mode in the O/D input split) are established. However, there is no limitation to the aspect described above. For example, the first differential mechanism and the second differential mechanism may be configured such that the first traveling mode is established in a state where the clutch CLc is engaged and the second traveling mode is established in a state where the clutch CL1 is engaged.

In this case, in a collinear diagram in which the rotation speeds of the rotation elements RE1 to RE6 in each of the first differential mechanism and the second differential mechanism can be relatively shown, the vertical line Y1 represents the rotation speed of the fourth rotation element RE4 to which the first rotating machine MG1 is connected, the vertical line Y2 represents the rotation speeds of the third rotation element RE3 and the sixth rotation element RE6 connected to each other, the vertical line Y3 represents the rotation speed of the second rotation element RE2 that is selectively connected to the case 18 through the brake BR1, and the rotation speed of the fifth rotation element RE5 connected to the output shaft 24, and the vertical line Y4 represents the rotation speed of the first rotation element RE1 to which the engine 12 is connected. In the configuration described above, the clutch CLc is the second engagement device that selectively connects the second rotation element RE2 and the fifth rotation element RE5.

Alternatively, in a collinear diagram in which the rotation speeds of the rotation elements RE1 to RE6 in each of the first differential mechanism and the second differential mechanism can be relatively shown, the vertical line Y1 represents the rotation speed of the second rotation element RE2 that is selectively connected to the case 18 through the brake BR1, and the rotation speed of the fourth rotation element RE4 to which the first rotating machine MG1 is connected, the vertical line Y2 represents the rotation speeds of the third rotation element RE3 and the sixth rotation element RE6 connected to each other, the vertical line Y3 represents the rotation speed of the fifth rotation element RE5 connected to the output shaft 24, and the vertical line Y4 represents the rotation speed of the first rotation element RE1 to which the engine 12 is connected. In the configuration described above, the clutch CLc is the second engagement device that selectively connects the second rotation element RE2 and the fourth rotation element RE4.

In the embodiment described above, the first differential mechanism 38 is a dual pinion type planetary gear mechanism and the second differential mechanism 40 is a single pinion type planetary gear mechanism. However, there is no limitation to the aspect described above. For example, the first differential mechanism may be configured with a single pinion type planetary gear mechanism. The second differential mechanism may be configured with a double pinion type planetary gear mechanism. Therefore, it goes without saying that the correspondence relationship between the first sun gear S1, the first carrier C1, and the first ring gear R1 in the first differential mechanism, the first rotation element RE1, the second rotation element RE2, and the third rotation element RE3, and the correspondence relationship between the second sun gear S2, the second carrier C2, and the second ring gear R2 in the second differential mechanism, the fourth rotation element RE4, the fifth rotation element RE5, and the sixth rotation element RE6 are not limited to the correspondence relationships shown in the first differential mechanism 38 and the second differential mechanism 40 in the embodiment described above.

In the embodiment described above, the clutch CL1, the brake BR1, and the clutch CLc are wet type hydraulic frictional engagement devices. However, the clutch CL1, the brake BR1, and the clutch CLc may be engagement devices in which an operating state is switched by electric power.

In the embodiment described above, the vehicle 10 is provided with the brake BR1. However, the brake BR1 does not need to be necessarily provided. Even in the vehicle 10 that is not provided with the brake BR1, the single drive EV mode, the U/DHV mode, the O/DHV mode, the direct connection fixed stage mode, and the like can be established, and in the HV traveling mode, the U/DHV mode and the O/DHV mode can be switched. In the vehicle 10, the second power transmission part 22 is a gear train having a connection relationship in which the second power transmission part 22 is disposed coaxially with the input shaft 36. However, for example, the second power transmission part 22 may be a gear train or the like, which has a connection relationship in which the second power transmission part 22 is disposed on an axis different from the axis of the input shaft 36. The present disclosure has been described using the power transmission device 14 that is suitably used for the FR type vehicle 10. However, the present disclosure can also be appropriately applied to a power transmission device that is used for other types of vehicles such as an FF type and an RR type, for example.

The above is merely one embodiment, and the present disclosure can be implemented in an aspect with various modifications or improvements added thereto based on knowledge of those skilled in the art.

What is claimed is:

1. A control device of a vehicle including a first rotating machine, a second rotating machine, an engine, a first differential mechanism, a second differential mechanism, an output rotating member that is connected to drive wheels of the vehicle, a first engagement device, and a second engagement device, the first differential mechanism including a first rotation element, a second rotation element, and a third rotation element, the second differential mechanism including a fourth rotation element, a fifth rotation element, and a sixth rotation element, the second rotating machine being connected so as to transmit power to the output rotating member, the engine being connected so as to transmit power to the first rotation element, the third rotation element being connected to the sixth rotation element, the first rotating machine being connected so as to transmit power to the fourth rotation element so as to control a differential state of the second differential mechanism, the fifth rotation element being connected to the output rotating member, the first engagement device being configured to selectively connect any two rotation elements among the first rotation element, the second rotation element, and the third rotation element, and the second engagement device being configured to selectively connect any one rotation element of the fourth rotation element and the fifth rotation element, and the second rotation element, the control device comprising an electronic control unit configured to selectively execute traveling in a first traveling mode and traveling in a second traveling mode, the first traveling mode being a traveling mode in which in a state where one engagement device of the first engagement device and the second engagement device is controlled so as to be engaged, a differential state of the second differential mechanism is controlled by the first rotating machine to transmit torque of the engine to the fifth rotation element, and the second traveling mode being a traveling mode in which in a state where the other engagement device of the first engagement device and the second engagement device is controlled so as to be engaged, a differential state of the second differential mechanism is controlled by the first rotating machine to transmit torque of the engine to the fifth rotation element, and perform switching to traveling in the second traveling mode in a case where a vehicle speed is equal to or higher than a predetermined vehicle speed when engine stop control that stops the engine is executed during traveling in the first traveling mode.

2. The control device according to claim 1, wherein:
the electronic control unit is configured to execute traveling in a third traveling mode, the third traveling mode being a traveling mode in which in a state where the first engagement device and the second engagement device are controlled so as to be engaged, each rotation element of the first differential mechanism and each rotation element of the second differential mechanism integrally rotate to directly transmit torque of the engine to the fifth rotation element; and
the electronic control unit is configured to perform switching from the first traveling mode to the second traveling mode via the third traveling mode in a case where a determination that a rotation speed of the engine does not increase even in switching from the first traveling mode to the third traveling mode is made.

3. The control device according to claim 1, wherein the electronic control unit is configured to execute traveling in a fourth traveling mode when the engine stops, the fourth traveling mode being a traveling mode in which the first engagement device and the second engagement device are disengaged to perform traveling by the second rotating machine.

4. The control device according to claim 1, wherein the electronic control unit controls the first rotating machine so as to stop the engine at a rotation angle appropriate for an engine restart after a stop of the engine or immediately before a stop of the engine.

5. The control device according to claim 1, wherein the predetermined vehicle speed is a lower limit value of a speed range in which a rotation speed of the first rotating machine exceeds an allowable value during the engine stop control, in a case where the engine stop control is executed in a state of the first traveling mode, or a value in a vicinity of the lower limit value.

* * * * *